(12) United States Patent
Kukita et al.

(10) Patent No.: US 7,091,421 B2
(45) Date of Patent: Aug. 15, 2006

(54) LINEAR OBJECT IDENTIFICATION TAG, AND INSTALLATION INSTRUMENT AND INSTALLATION METHOD FOR SAME, LINEAR OBJECT WITH CONNECTOR

(75) Inventors: Shigezo Kukita, Tokyo (JP); Kenichi Hanari, Tokyo (JP)

(73) Assignee: NTT Advanced Technology Corporation, Tokyo (JP)

( * ) Notice: Subject to any disclaimer, the term of this patent is extended or adjusted under 35 U.S.C. 154(b) by 0 days.

(21) Appl. No.: 10/501,446

(22) PCT Filed: Jan. 14, 2003

(86) PCT No.: PCT/JP03/00219

§ 371 (c)(1),
(2), (4) Date: Jul. 13, 2004

(87) PCT Pub. No.: WO03/063315

PCT Pub. Date: Jul. 31, 2003

(65) Prior Publication Data

US 2005/0085121 A1    Apr. 21, 2005

(30) Foreign Application Priority Data

Jan. 18, 2002    (JP)    ............... 2002-010461

(51) Int. Cl.
  G09F 3/00    (2006.01)
  H01R 3/00    (2006.01)
(52) U.S. Cl. .................. 174/112; 40/316; 439/491
(58) Field of Classification Search ............... 439/491; 174/112; 40/316; 29/243.56
See application file for complete search history.

(56) References Cited

U.S. PATENT DOCUMENTS

| | | | | |
|---|---|---|---|---|
| 4,578,573 A | * | 3/1986 | Flies et al. | 235/492 |
| 4,649,658 A | * | 3/1987 | Sarton et al. | 40/316 |
| 4,682,411 A | * | 7/1987 | Tomes, Jr. | 29/745 |
| 4,876,810 A | * | 10/1989 | Piana et al. | 40/316 |
| 5,110,638 A | * | 5/1992 | Vogdes et al. | 428/35.1 |
| 5,210,923 A | * | 5/1993 | Mori et al. | 29/453 |
| 5,910,776 A | * | 6/1999 | Black | 340/10.1 |

FOREIGN PATENT DOCUMENTS

| | | | |
|---|---|---|---|
| DE | 3908917 | * | 9/1990 |
| EP | 568510 | * | 11/1993 |
| EP | 1103824 A2 | | 5/2001 |
| WO | 90/10284 | * | 9/1990 |

* cited by examiner

Primary Examiner—Neil Abrams
(74) Attorney, Agent, or Firm—Harness, Dickey & Pierce, P.L.C.

(57) ABSTRACT

The linear object identification tag 10 can be attached to and detached from a linear object 40. This tag has a clip body having a pair of clip parts 1a, 1b openably joined to a base part 6, and a holding part 8, 9 which holds the linear object 40 inside the linear object identification tag and is formed on an inner face of at least one of the clip parts 1a, 1b. Installation is thus efficiently performed by simply inserting the linear object 40 through an aperture part. 7. An installation tool (FIGS. 12, 13) with guide parts (22c, 22d) for opening the clip parts (1a, 1b) as they are slid along the tool is disclosed. In another embodiment, labels (719, 720) may be applied to plugs (75) and receptacle (72) and an instrument (722) with optical readers (723, 724) used to read codes on the labels.

15 Claims, 22 Drawing Sheets

PRIOR ART

PRIOR ART

PRIOR ART

LINEAR OBJECT IDENTIFICATION TAG, AND INSTALLATION INSTRUMENT AND INSTALLATION METHOD FOR SAME, LINEAR OBJECT WITH CONNECTOR

TECHNICAL FIELD

The present invention relates to a linear object identification tag for individual management and identification of linear objects such as cords, wires and tubes, and an installation instrument and installation method for the same, and is suitable especially for the installation of linear objects positioned at high-density in a narrow space.

Also, the present invention relates to a method for connector interconnection management for the central management of the connection status of connectors, and a connector, a connector receptacle, a connector receptacle board and a connector interconnection instrument which are used for the same.

BACKGROUND ART

Conventionally, an identification tag such as that shown in FIG. 28 and FIG. 29 for the individual management and identification of a linear object such as a cord or a wire, has been known.

In FIG. 28, the identification tag has plate-like clip parts 100a and 100b with one of their edges joined so that they are able to open. On each of the inner faces of the clip parts 100a and 100b, grooves 200 of semicircular cross-section are respectively formed to hold a linear object, and the grooves 200 extend in a direction parallel to the joint part (the left longitudinal edge in the figure) of each of the clip parts 100a and 100b. Then, after opening each of the clip parts 100a and 100b and fitting a linear object in the grooves 200, the identification tag is installed on the linear object 40 as shown in FIG. 29 by pressing both clip parts 100a and 100b together and closing them with a hook 300.

Incidentally, the shape and dimension of the grooves 200 need to substantially correspond to the shape and dimension of the linear object 40 in order to be properly able to lock onto the linear object 40, that is, so that the identification tag does not fall when it is installed on a linear object 40 which is provided vertically. As a result, the shape and dimensions of the grooves 200 require high accuracy, and there is a concern of increasing production cost. Also, in order to suppress changes in the shape and dimensions of the groove 200 caused by temperature change in the environment, there is also concern that material with a low coefficient of linear expansion needs to be selected for the identification tag, and restrictions to the environment of use thus occur.

Furthermore, for linear objects with a different shape and dimensions, even if the differences in shape and dimensions are small, an identification tag corresponding to each linear object needs to be individually prepared. As a result, the cost of the identification tags becomes relatively high, and working efficiency decreases as the installation operation has to be carried out while selecting identification tags.

Moreover, when opening each of the clip parts 100a and 100b and fitting the linear object in the groove 200 as mentioned above, the linear object may become parted from the groove 200 before each of clip parts are pressed together, and the installation of the linear object must therefore to be carried out cautiously. Hence workability is reduced. Especially when the linear object has a flexure tendency or such, the installation needs to be carried out cautiously with careful attention to the direction of flexure, and workability is thus reduced further.

Also, when installing on a number of linear objects arranged with high density in a narrow space, because handling the identification tags and determining the positioning of the grooves and the linear objects become difficult, installation workability becomes reduced even further. If each of the clip parts is forced together while the linear object is dislocated from the grooves 200, then the linear object will be pressed by the part outside the grooves, and there is a possibility of causing a defect in one or both of the linear object and the identification tag.

In consideration of the above, an improved version of a linear object identification tag shown in FIG. 30 has also been developed. This linear object identification tag does not require the dimension of the groove to be the same as the dimension of the linear object that the tag is to be installed on, and the dimension of the groove is allowed a margin.

In this figure, an inner space 210 linking with a groove 200" and also having its diameter larger than that of the groove 200" is formed on the center of the inner face of one of clip parts 100b', and a blade spring 220 is provided on the wall surface of the inner space 210. In this case, when the linear object is fitted into the groove 200" and 200' and both clip parts 100a and 100b are put together and the hook 300 closed, the linear object is forced against the groove 200' side by the blade spring 220 and is pressed against the groove 200' and locked. Therefore, the dimension of the groove is allowed a margin because even if the dimension of the groove is larger than that of the linear object, the identification tag will not fall from the linear object.

However, this margin is generally given to be only slightly larger than the dimension of the groove and linear object, and is only able for example to absorb the dimensional change due to temperature change. Therefore, the possibility of installation of a single identification tag on linear objects with differing shape and dimensions is not achieved, and the inefficient operation of installing while selecting the identification tag is still involved. Also, because there is still an operation of fitting the linear object in the groove while opening the clip parts, and closing and pressing together the clip parts while paying careful attention not to have the linear object parted from the groove, problems such as the reduction of operation workability, the linear object being pressed by parts other than the grooves, or the operation of installation onto a linear object with flexure tendency being difficult, still cannot be solved.

Also, because both of the two types of identification tags mentioned above require the operation of pressing together the clipping parts after fitting the linear object in the grooves, the installation operation naturally requires both hands. Therefore, especially when having a number of linear objects provided (at high density) in a narrow space, there are concerns such as that the workability of the installation of a linear object identification tag is reduced due to the restrictions on the movement of hands and fingers, that the identification tag may be dropped, and that the linear object may become defective while fumbling with linear objects during the installation. Because of these concerns, there has been a demand for the development of an identification tag which can be easily installed onto a linear object, or an instrument or a method of installation which allow easy identification tag installation to a linear object.

An object of the present invention is to provide a linear object identification tag having excellent workability of installation onto a linear object when managing and identifying linear objects such as cord, wire and tube, and being applicable to linear objects with differing shapes and dimension, and an instrument and method of installation for the same.

Next, FIG. 31 shows a connector receptacle board 63 used at a communication equipment station. This connector receptacle board 63 has a number of connector receptacles 62 to which communication lines with connectors are connected. The conventional connector interconnection and management method using this connector receptacle board 63 is described below.

Reference symbol 61 in the figure denotes a communication line connected to a remote device. A connector receptacle 62 is respectively connected to each individual end of some communication lines 61, and these connector receptacles 62 are interconnected in grid form on the front face of the connector receptacle board 63. Reference symbol 64 denotes a communication line that links communication devices in the communication station, and reference symbol 65 denotes connectors that are provided at both ends of the communication line 64. A communication line with connectors 66 comprises the communication line 64 and the connectors 65 at both ends.

By connecting the connector 65 of the communication line with connectors 66 to the connector receptacle 62 of the connector receptacle board 63, a remote device is connected to a device in the station via the communication line 61, the connector receptacle 62, and the communication line with connectors 66. By changing the device in the station connecting to the connector 65 of the communication line with connectors 66, the remote device can be freely switched to a connection with devices in the station having different functions.

When the connection from the remote device to the device in the station falls into disuse, the communication line is removed by unplugging the connector 65 of the communication line with connectors 66. Reference symbol 67 denotes a label having hand written data identifying the communication line with connectors, which is attached to the above mentioned communication line with connectors 66 with a string. Also, reference symbols 68 and 69 are code-labels respectively positioned in a longitudinal direction and crosswise direction on the connector receptacle board to identify the connector receptacle 62.

In this way, conventionally, the interconnection status of connectors, or communication lines with connectors, to a connector receptacle has been managed by identifying a communication line with connectors with a hand written label, and identifying a connector receptacle with the two code-labels positioned in a longitudinal direction and crosswise direction on the connector receptacle board, and furthermore by handwriting into a management table or entering manually into a management database whether a given connector receptacle was connected, or free.

That is to say, the conventional connector interconnection status management led easily to incorrect management information due to the records on the labels being handwritten by the operator, connector receptacle selection being carried out by means of visual checking, and records of connection presence status of the connector receptacle being hand written. In addition it had the disadvantage of the possibility of communication failure and so forth caused by incorrectly removing a connector in communication due to this incorrect information.

Also, because the dimensions of the label 67 can not be made small due to being handwritten and because it is formed to be hung on a communication line, then on a connector receptacle board that has connector receptacles arranged at high density, the density of the communication lines with connectors that are connected to this also becomes high, and a number of the labels come to hang between the communication lines. Therefore, there is the disadvantage that operation efficiency becomes drastically reduced as communication lines get damaged due to entanglements between labels, or between labels and communication lines, during the operation of connection and removal of the communication lines with connectors. Furthermore, there is the major disadvantage that this leads to serious failures such as removal of the incorrect communication line with connectors, or connection to an incorrect connector receptacle due to erroneous visual recognition of a label.

Another conventional method for connector interconnection management is described making reference to FIG. 32. Reference symbol 610 denotes a label to which is attached the identification code of the connector converted into a two dimensional code, and reference symbols 611 and 612 denote labels in which the codes in a longitudinal direction and crosswise direction respectively are converted into two dimensional codes to identify a connector receptacle. Also, reference symbol 613 denotes a two-dimensional code reader device comprising a reader part 614 and a hand-held device 615 having the function of controlling the reader part 614 and displaying the read data.

This method reduces incorrect entries to labels, and mistakes such as disconnection of incorrect connectors can be reduced compared to the case of handwriting, because identification codes of connectors are formulated and converted into two dimensional codes and printed on labels by a computer device. Also, because the connector identification code and connector receptacle identification code are verified and simultaneously recorded as an operation record on the hand-held device by reading the labels 610, 611 and 612 with the reader device 613, if the connector identification code and connector receptacle identification codes of the connectors to be operated on, are registered on the hand-held device beforehand, it becomes possible to check the registered contents against the actual operation record so that operation mistakes will be reduced even further.

Furthermore, by converting information such as connector identification code into two dimensional code, the dimensions of the label become smaller, and it can be directly attached to a communication line with connectors as shown in FIG. 32, and tangling of labels or of a label and a communication line can be prevented.

However, as connector receptacles are interconnected to the connector receptacle board in high density, the density of communication lines with connectors 66 extending from the connector receptacle becomes higher, and the operation of removal and connection of connectors provided in the inmost recesses of dense connector communication lines has become difficult to carry out by hand.

An example of a conventional connector interconnection instrument 618 used for connector connection removal operation on the terminal strip of connector receptacles provided in high density is shown in FIG. 33. The connector interconnection instrument 618 has a connector grip part 616 to hold a connector and a control button to control the operation of the grip part by hand.

When this connector interconnection instrument 618 is used, the cumbersome task of using two instruments, namely the two-dimensional code reader device 613 shown in FIG. 32, and the connector interconnection instrument 618 shown in FIG. 33, occurs during the operation of connecting and removing a single connector. For example, when removing a connector, after reading the label 610 of the communication line with connectors and the labels 611 and 612 of the connector receptacle board with the reader device 613, the hand-held reader device 613 needs to be exchanged for the connector interconnection instrument 618, and the previously verified communication line with connectors is removed from the connector receptacle which has also been verified with the reader device in the same manner.

As just described, not only is the operation cumbersome and of reduced workability, but the communication line with connectors, and the connector receptacle, which are the objects of the operation, need to be kept or verified at all times while two types of hand held instruments are exchanged, and if care is not taken, the incorrect communication line with connectors will be removed and there is a risk of communication failure occurring.

Moreover, the connector connection information which indicates whether or not a connector is connected to the connector receptacle needs to be manually entered, and in this there is no change from the prior art in FIG. 1. Therefore, the risk of entering incorrect information at this stage remains.

DISCLOSURE OF INVENTION

The linear object identification tag according to the present invention is a linear object identification tag which can be attached to and detached from a linear object. The linear object identification tag has a clip body having a pair of clip parts openably joined to a base part, and a holding part which holds the linear object inside the linear object identification tag and is formed on an inner face of at least one of the clip parts.

Therefore, installation is possible by simply inserting the linear object from an aperture part, and the efficiency of the installation operation can be greatly improved. Furthermore, because the shape and dimensions of the linear object are not especially restricted provided that it can be fitted inside the linear object identification tag, it is applicable to various types of linear object of different shapes and dimension, and as there is no cumbersome task such as preparing many types of linear object identification tags to suit the linear objects, and selecting a linear object identification tag to suit a linear object during the installation, there is the advantage that the installation operation can be made more efficient.

Moreover, because accurate alignment of the linear object and verification operations are not required during the installation, the installation in cases where linear objects are provided in high density in a small space, and the installation onto linear objects having a flexure tendency is made easy. Furthermore, there is no concern of causing a defect by clipping the linear object with the identification tag during the installation, thus, making highly reliable installation operations possible.

Additionally, because the shape and dimensions of the linear object identification tag do not require high accuracy and some margin can be allowed, the production yield is improved and the cost of production can be reduced. In addition to this, because a presser part locks the linear object on the base part with moderate frictional force, the linear object identification tag does not fall even where the linear object is provided vertically, and the linear object identification tag can also be slid along the linear object.

The holding part may have a presser part which elastically presses the linear object against an inner face of the base part or the clip part.

The holding part may have an anti-disengagement tongue piece, which is formed to extend from an inner face of the clip part, and which prevents the linear object from falling out from between the clip parts.

The holding part may have; a presser part which elastically presses the linear object against an inner face of the base part or the clip part, and an anti-disengagement tongue piece, which is formed to extend out from an inner face of the clip part, and which prevents the linear object from falling out from between the clip parts.

A spacing of an aperture part formed at an end of the pair of clip parts may be smaller than a width of the base part.

On an inner face of at least one of the clip parts there may be formed a rough surface having a plurality of protrusions at a position where the linear object contacts.

The protrusions of the rough surface may be a plurality of ridges extending in parallel with a longitudinal direction of a linear object held by the linear object identification tag.

The linear object identification tag may also have a band for fixing the linear object identification tag to the linear object, and two or more band holes for passing a band therethrough may be formed on at least one of the clip parts.

The clip parts may have a contour formed with curved lines.

Each of the pair of clip parts may have a wide part which is longer than a length of the base part.

One or more guide parts extending in an orthogonal direction to an inner surface of the base part may be provided on an outer face of at least one of the clip parts, and the guide parts may engage slidably with a slide member provided in an installation instrument which houses the linear object identification tag and installs it on a linear object.

An identification label may be provided on an outer surface of the clip part. This identification label may have a bar code or a two-dimensional code.

The installation instrument of the present invention is an installation instrument for installing a linear object identification tag on a linear object, and comprises: a slide member which engages slidably with the linear object identification tag; an opening guide which, holds the linear object, contacts with an inner face of the clip part while the linear object identification tag slides along the slide member, and opens the two clip parts; and an installation member which makes the linear object identification tag contact the opening guide, opens the two clip parts, and installs the linear object identification tag on the linear object.

An installation method of the present invention is an installation method for installing the aforementioned linear object identification tag onto a linear object, and comprises: a step for slidably engaging a slide member with the linear object identification tag; a step for making an opening guide hold the linear object, and making the linear object identification tag slide along the slide member, and making the opening guide contact an inner face of the clip part, and opening the two clip parts; and a step for making the linear object identification tag contact the opening guide, opening the two clip parts, and installing the linear object identification tag on the linear object.

According to the linear object identification tag installation instrument and installation method of the present invention, because the housed linear object identification tag can be installed on the linear object by opening the two clip parts when it is slid along the slide member, the installation operation becomes easier.

Another aspect of the present invention is a method for connector interconnection management, which manages an interconnection status of a plurality of connectors with a plurality of connector receptacles, wherein the method manages the interconnection status of the connector with the connector receptacle, when connection and disconnection of a connector is carried out by a connector interconnection instrument which has a connector connection and disconnection function for connecting a connector to a connector receptacle and disconnecting a connector from a connector receptacle, by carrying out reading or writing by means of the connector interconnection instrument, for at least one of: connector information assigned to a connector, connector receptacle information assigned to a connector receptacle, and connector connection presence information indicating whether or not a connector is connected to a connector receptacle.

According to the method for connector interconnection management of the present invention, it becomes possible to correctly acquire connector information assigned to a connector, connector receptacle information assigned to a connector receptacle, and connector connection presence information, during a series of connection and disconnection operations of a connector, and connector interconnection status can be managed accurately.

Also, because it becomes possible to carry out the series of operations using a single connector interconnection instrument, without having to exchange a plurality of hand held instruments, it becomes possible to carry out the operation, while facing and verifying the connector and the connector receptacle for the operation target at all times, and the risk of having a connector or connector receptacle incorrectly connected or disconnected is reduced making the operation greatly more efficient.

By using two dimensional code or semiconductor memory, which allow more information amount for labels provided on connectors and connector receptacles; or using wireless tags and so forth, not only their respective identification data but also individual model numbers, specifications, manufacturer names and production lot numbers, and even the ancillary data such as the model number, specifications, manufacturer name and production lot number of each connected communication line can be held together.

When these ancillary data are displayed on the hand held device, the operator instantly becomes aware of a lot of information and is able to carry out the operation and make decisions, so that the advantages of mistake reduction in the operation, and improved efficiency of operation can be achieved.

Moreover, when semiconductor memory, which allows rewriting of recorded content, and wireless tags are used, variable data such as the implementation date of the connection and disconnection operation and the operator's name can be recorded and updated as ancillary data, and more detailed management can be realized.

Another embodiment of the present invention is a connector interconnection instrument for carrying out connection and disconnection of a connector to and from a connector receptacle by gripping the connector, and has at least one of: a connector information read-write device, which carries out reading or writing of connector information to or from a label provided on the connector or on a linear object connected to the connector; a connector receptacle information read-write device, which carries out reading or writing of the connector receptacle information to or from a label provided on the connector receptacle or on a connector receptacle board connected to the connector receptacle; and a connector connection detecting device which acquires connector connection presence information indicating whether or not the connector is connected to the connector receptacle, and also has a communication device, which transmits and receives the aforementioned information to a computer.

A linear object with a connector of another aspect of the present invention has a semiconductor memory or wireless tag which has a record of connector information, provided on a connector or on a linear object connected to the connector.

A connector receptacle of another aspect of the present invention has; a label which has a record of connector receptacle information, and a device for acquiring connector connection presence information indicating whether or not a connector is connected to this connector receptacle.

Another aspect of the present invention is a connector receptacle board provided with a plurality of connector receptacles, and which has; labels that have a record of connector receptacle information corresponding to each of the connectors, and a device for acquiring connector connection presence information indicating whether or not a connector is connected to each of the connector receptacles.

BEST MODE FOR CARRYING OUT THE INVENTION

Preferred embodiments of the present invention will be described, with reference to the drawings. However, the present invention is not limited to each of the following embodiments, and specifically, constituents of these embodiments may be arbitrarily combined. Also, hereunder the linear object identification tag and the installation instrument of the linear object identification tag are respectively abbreviated to "identification tag" and "installation instrument" as appropriate.

Figure 1:
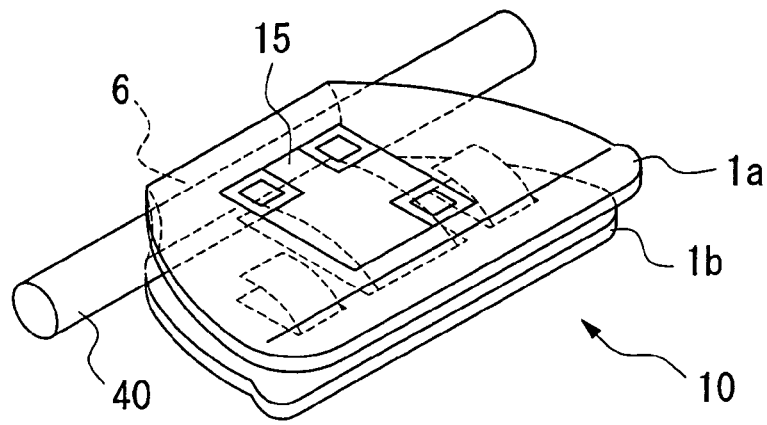
FIG. 1 is a perspective view showing a linear object identification tag according to a first embodiment of the present invention.
Figure 2:
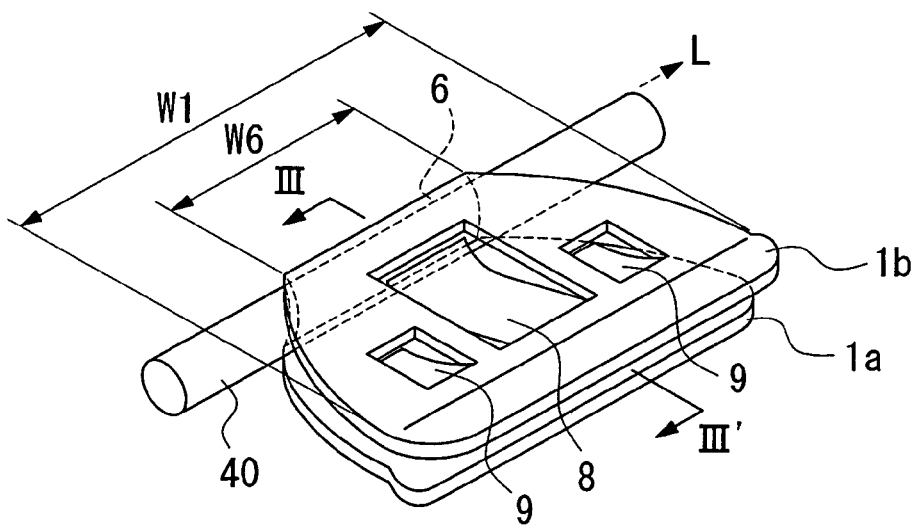
FIG. 2 is another perspective view showing the linear object identification tag according to the first embodiment of the present invention.
Figure 3:
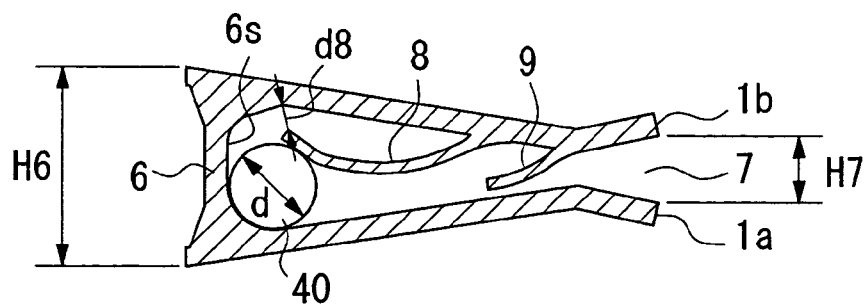
FIG. 3 is a cross-sectional view along the line III–III' of FIG. 2.

FIG. 1 to FIG. 3 are diagrams showing the construction of a linear object identification tag according to a first embodiment of the present invention. In FIG. 1, the linear object identification tag 10 has a cross section U shape, and has one edge of each tabular clip part 1a and 1b openably joined at a base part 6. A linear object 40 is housed and installed inside the identification tag. An outer face of one clip part 1a has an identification denotation 15 provided to identify and manage the linear object. This identification denotation may be a digit, letter, marking, color, barcode or two-dimensional code. Furthermore, the identification denotation may be directly marked on the outer face of the clip part by means of printing, laser and so forth, and also, the label may be attached on the outer face of the clip part after the identification denotation has been printed on it. Identification denotations may be formed on both clip parts if possible.

FIG. 2 shows the appearance of the linear object identification tag 10 when seen from the clip part 1b side. The center part of the clip part 1b is cut out, and the cut part has a tongue-piece-shaped presser 8 provided to hold the linear object. The areas positioned on both sides of the cut out part are also cut out in the same way, and the cut out parts have anti-disengagement tongue pieces 9 formed in them.

In this embodiment, when seen from the direction L (the same direction as the longitudinal direction of the linear object housed inside) along the inner face of the base part 6, the width W1 of the widest part (the wide part) among the clip parts 1a and 1b is greater than the length W6 of the base part 6. This will be described later. Also, both the holding part 8 and the anti disengagement tongue pieces 9 are attached to the edge in parallel to the longitudinal direction L of the linear object 40 and are on the side away from the base part 6 inside the edges of the hollowed parts of the clip part 1b, and they extend in a crescent shape protruding towards the inside of the identification tag. The holding part 8 and anti-disengagement tongue pieces 9 bow in spring form having the attachment end as a supporting point.

FIG. 3 is a cross-sectional view along the line III–III' of FIG. 2. In this diagram, the ends (free ends) of the clip parts 1a and 1b form an aperture part 7, and the linear object 40 is taken inside the identification tag through the aperture part 7. In this embodiment, the identification tag is comprised of, for example, synthetic resin, metal or so forth having elasticity, and each of both clip parts 1a and 1b is able to open elastically by bowing. Therefore, even if the diameter d of the linear object 40 is somewhat greater than the spacing H7 of the aperture part 7, the linear object 40 goes through the aperture part 7 by opening the clip parts 1a and 1b with the base part 6 as the supporting point, and furthermore, it is taken inside, depressing the anti-disengagement tongue pieces 9 and the holding part 8 in this order.

Specifically, in this embodiment, because the anti disengagement tongue pieces 9 and the holding part 8 extend obliquely towards the base part 6 side, the construction is such that the linear object 40 easily enters inside and does not disengage easily.

In this embodiment, the holding part 8 applies a force to the linear object 40 by elastic force in the direction toward the inner face of the base part 6s. Therefore, the linear object 40 is pressed against the inner face 6s of the base part or the inner faces of clip parts 1a and 1b, and is locked on any part of these by frictional force. For example, in this embodiment, the linear object 40 is locked at the inner face of one of the clip parts 1a and the inner face of the base part 6. In this way, because the holding part 8 properly locks the linear object 40 inside the identification tag, even when the linear object is provided vertically or when the diameter of the linear object is smaller than the inner space (spacing between inner faces of each clip part) of the identification tag, the identification tag does not fall off or become detached from the linear object. In other words, the identification tag of the present invention can be installed on any linear object as long as the diameter of the linear object is smaller than the spacing between the inner faces of each clip part.

Because the holding part 8 only applies force to (thrusts) the linear object with elastic force, the identification tag 40 can be slid deliberately in the longitudinal direction of the linear object 40. Therefore, when the linear objects are provided in high density in a small space and the identification denotation 15 of the linear object identification tag or other denotations are difficult to read, the reading can be done by sliding the identification tag to a position where it can be read easily, so that excellent workability for reading in a small space is achieved.

Incidentally, because the linear object identification tag of the present invention is of a clip form, there is a possibility of the linear object disengaging through the aperture part. In such cases, the aforementioned anti disengagement tongue pieces 9 takes effect. For example, in FIG. 3, because the anti disengagement tongue pieces 9 is provided near the aperture part 7 and also extend toward the base part 6, even if the linear object 40 approaches the aperture part 7 from inside, it contacts the end of the anti disengagement tongue pieces 9 and is locked, and the linear object 40 is prevented from disengaging through the aperture part 7. The method to prevent disengagement is not limited to the tongue pieces, and for example, a V shape prong may be formed as an obstacle near the aperture part 7 by making the space between the end of the prong and the face opposing it smaller than the diameter of the linear object 40. Also, in the aforementioned embodiment, although the holding part 8 and the anti disengagement tongue pieces 9 are provided on the same side of the clip part 1a, the holding part 8 may be provided on the clip part 1a side and the anti disengagement tongue pieces 9 may be provided on the clip part 1b side.

If a distance d8 between the end of the holding part 8 and the inner face of the clip part 1a is made to be smaller than the diameter d of the linear object 40, the linear object can be prevented from entering to the back side of the holding part 8. Also, in this embodiment, the width H7 of the aperture part is smaller than the width H6 of the base part.

Next, the effect of the case in which the width W1 of the wide part of the clip part is made to be greater than the length W6 of the base part as shown in FIG. 2 is described with reference to FIG. 4 to FIG. 6. This effect is generated by using an installation instrument such as is shown in FIG. 4.

Figure 4:
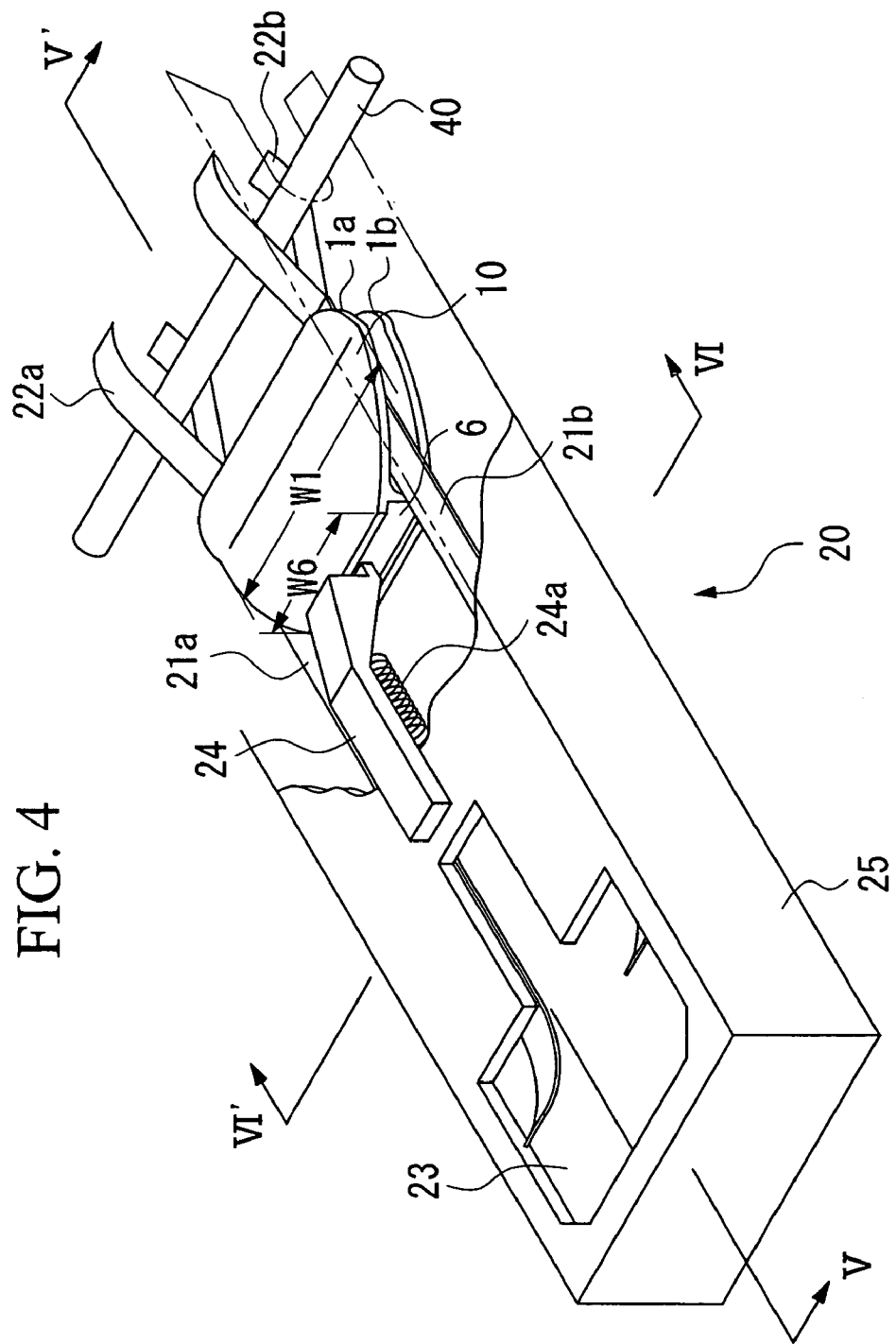
FIG. 4 is a perspective view showing an embodiment of an installation instrument of the present invention.

In FIG. 4, an installation instrument 20 for the linear object identification tag has a case 25 of a simple box shape. An aperture 23 having a rather greater contour than the planar shape of the linear object identification tag 10 is formed at one end of the top face of the case 25, and the linear object identification tag 10 can be taken in through this aperture 23. Narrow rectangular slide rails (slide members) 21a and 21b respectively extending from the fore to the rear in the diagram are provided in parallel with each other on the inner faces of the opposing side faces on the long sides of the case 25, and opening guides 22a and 22b, described later, are connected to the rearward ends of each of the slide rails. Also, the end parts of the slide rails 21a and 21b on the forward side bow upward toward the aperture 23. Moreover, a pushing plate (installation component) 24, described later, is provided near the center on the top face of the case 25, and it moves back and forth in the direction in which the slide rails extend and is returned to its initial position by a coil spring 24a.

The distance between each of the slide rails 21a and 21b is greater than the length W6 of the base part of the identification tag and less than the length W1 of the wide part. Therefore, when the identification tag is inserted through the aperture 23 so that the inner face of the base part of the identification tag 10 is orthogonal to the direction in which the slide rails extend, (the wide part of) the clip parts of the identification tag clip the slide rails and the identification tag is held on the slide rails. Then in this state, if the installation instrument 20 is tilted, the identification tag slides along the slide rails from the fore to the rear in the diagram under its own weight, and the uniform end part of the pushing plate 24 can be locked at the base part 6 of the identification tag. If the pushing plate 24 is pressed further toward the back side in the diagram, the identification tag contacts the opening guides 22a and 22b, and the clip parts 1a and 1b open.

Figure 5:
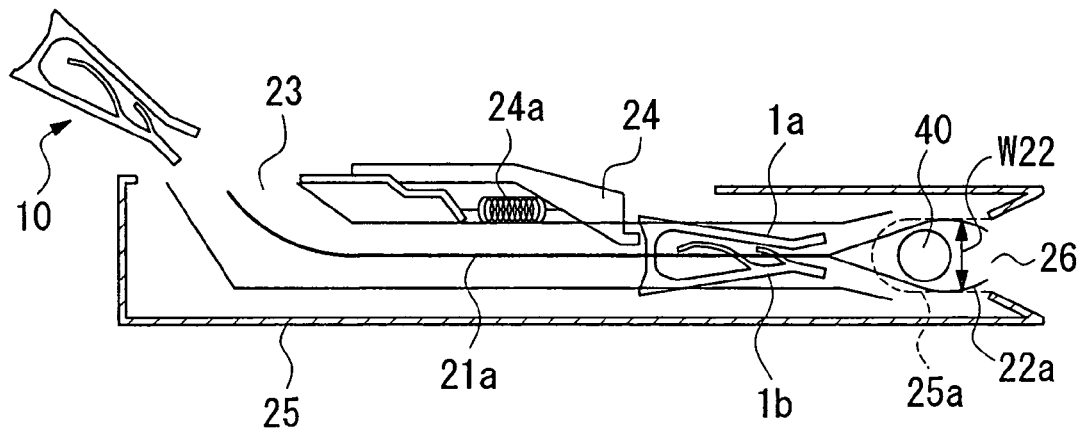
FIG. 5 is a cross-sectional view along the line V–V' of FIG. 4.

Next, making reference to FIG. 5, the mechanism of opening the clip parts of the identification tag is described. FIG. 5 is a cross-sectional view along the line V–V' of FIG. 4. In this diagram, the base end of the opening guide 22a is connected to the end part of the slide rail 21a, and has a scissors shape bifurcating in two directions from the base end in the longitudinal direction (specifically, in the direction in which the clip parts open) of the diagram. The maximum width W22 of the bifurcated part is greater than the diameter of the linear object 40, onto which the tag is installed. Therefore, when the pushing part 24 is pressed, the inner faces of the wide parts of the clip parts 1a and 1b respectively contact the two bifurcation parts of the opening guide 22a, and when the identification tag is pushed further, each of clip parts are forced open along the shape of the bifurcated part. The same applies to the opening guide 22b.

As long as the linear object 40 is held pinched by the bifurcating arms of each opening guide 22a and 22b, that is if the linear object 40 is held in a condition where its longitudinal direction is parallel with the inner face of the base part 6 of the identification tag, the linear object 40 can be taken inside the identification tag when each of the clip parts open. If the identification tag is pushed out further in this situation, each of the clip parts goes over the ends of the opening guides and the clip parts close, the identification tag is discharged through the front eject opening 26 of the installation instrument 20. At this time, the linear object 40 inside the identification tag goes over the anti disengagement tongue pieces 9 and the holding part 8 sequentially, and is locked on the inner face of the base part or the clip parts by the elastic force of the holding part 8. By so doing, the identification tag holds the linear object 40 and is installed on the linear object 40.

Because the side wall of the case 25 has a notch part 25a near the front eject opening 26, by inserting the linear object 40 at this notch part, the linear object 40 can be pinched (held) by the branching arms of each of the opening guides. Then, in the actual operation, the linear object 40 is held by the branching arms by simply pressing the front eject opening 26 against the linear object 40, and the identification tag can be installed.

Figure 6:
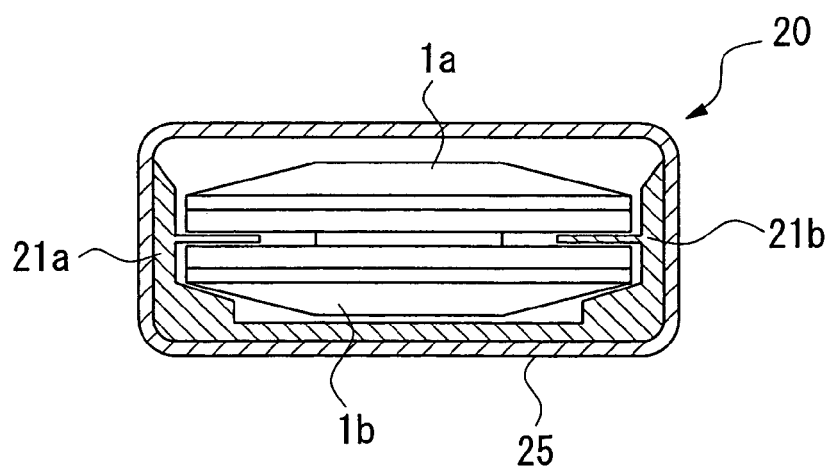
FIG. 6 is a cross-sectional view along the line VI–VI' of FIG. 4.

FIG. 6 is a cross-sectional view along the line VI–VI' of FIG. 4, showing that the identification tag is held by clipping the slide rails 21a and 21b, which extend inwards from the inner face of the side-wall of the case 25, with the clip parts 1a and 1b.

As described above, if an installation instrument 20 of the aforementioned construction is used, then without having to hold the linear object in hand when carrying out installation of the identification tag, and by simply pressing the linear object 40 against the front eject opening 26 of the installation instrument 20 and further pushing the pushing plate 24, the linear object identification tag can be installed easily on the linear object using only one hand. Especially in a narrow space having thin linear objects provided at high density, the identification tag can be installed on the predetermined linear object by simply inserting only the installation instrument into the group of dense linear objects and pushing the pushing plate. Hence the installation operation is drastically improved.

Figure 7:
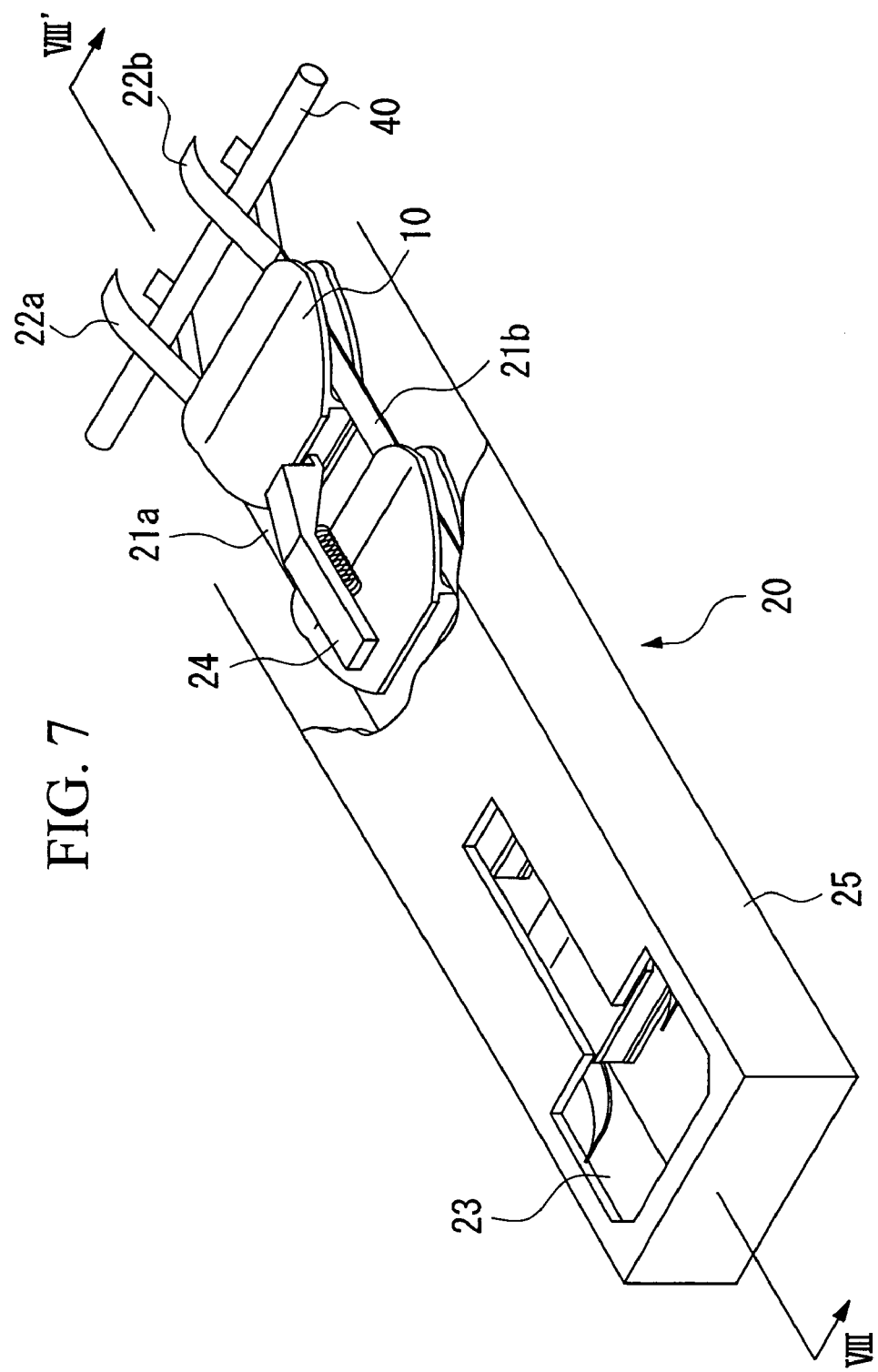
FIG. 7 is a perspective view showing an aspect where the installation instrument houses a linear object identification tag.
Figure 8:
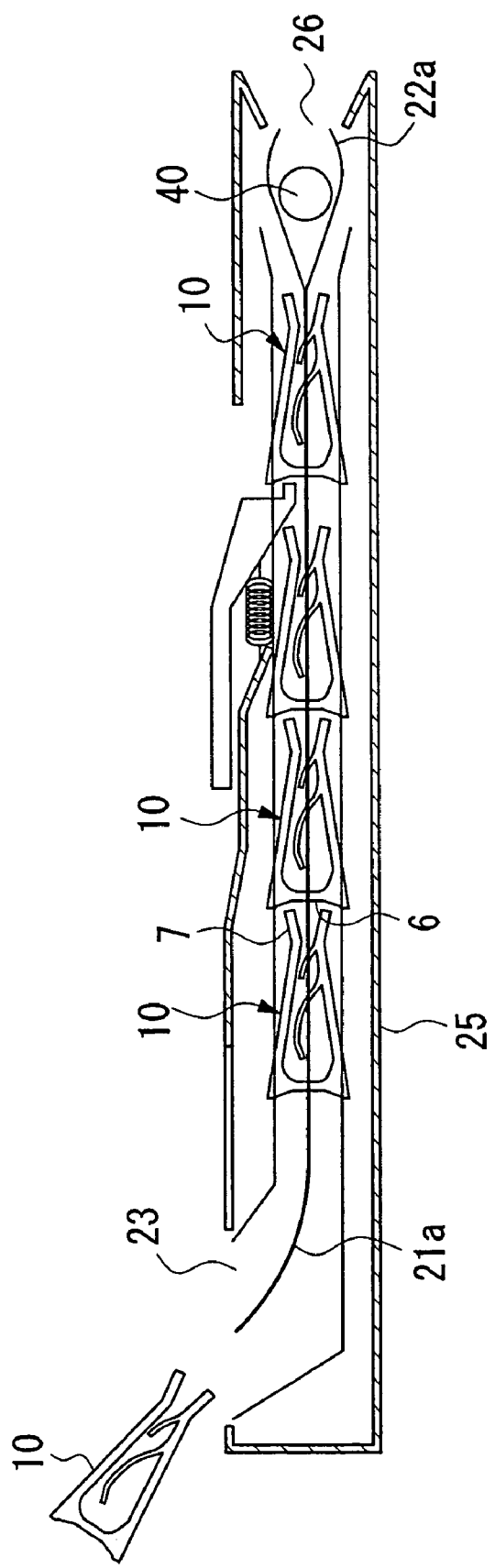
FIG. 8 is a cross-sectional view along the line VIII–VIII' of FIG. 7.

Next, the effect of making the spacing H7 of the aperture part of the identification tag smaller than the width H6 of the base part as shown in FIG. 2 is described, making reference to FIG. 7 and FIG. 8. This effect is generated when an installation instrument the same as that of the aforementioned FIG. 4 is used and a number of linear object identification tags 10 are housed inside the installation instrument.

FIG. 7 shows identification tags 10 being housed inside the installation instrument 20, and each identification tag is housed inside in a line along the slide rails 21a and 21b.

FIG. 8 is a cross-sectional view along the line VIII–VIII' of FIG. 7. The base part 6 of an identification tag and the aperture part 7 of the identification tag behind and adjacent to the base part are contacted and housed inside the installation instrument 20. In this case, because the spacing H7 of the aperture part is smaller than the width H6 of the base part, even if a number of identification tags are provided in a line, the aperture part 7 of the identification tag behind does not clip the base part 6 of the identification tag in front. Therefore, when the identification tags are loaded inside the installation instrument 20 or an identification tag is slid forward inside the installation instrument 20, the identification tags do not interlock and cause defective sliding, and a number of identification tags can be supplied consecutively to carry out the installation operation consecutively. Hence workability can be dramatically improved.

Figure 9:
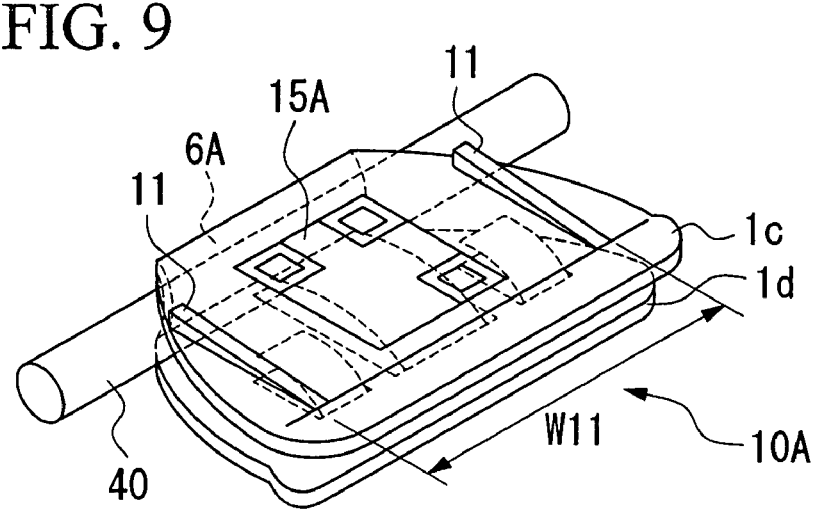
FIG. 9 is a perspective view showing a linear object identification tag according to a second embodiment of the present invention.
Figure 10:
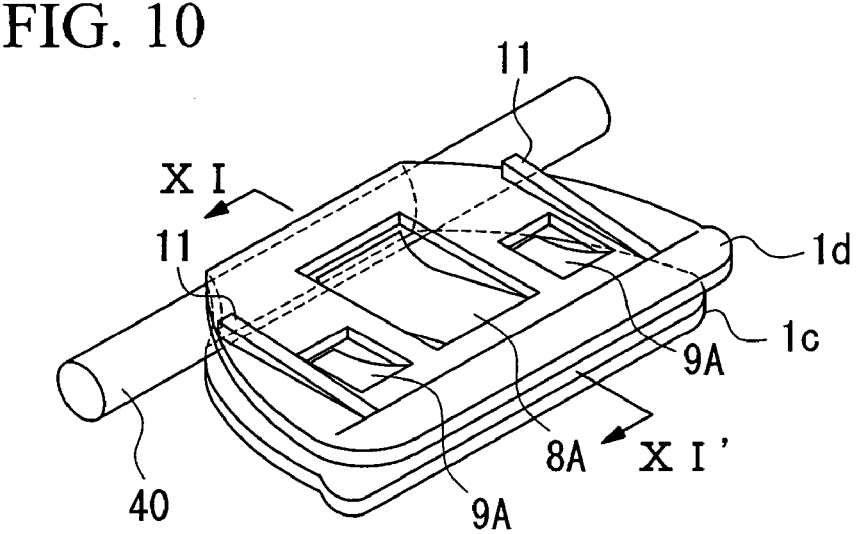
FIG. 10 is another perspective view showing the linear object identification tag according to the second embodiment of the present invention.
Figure 11:
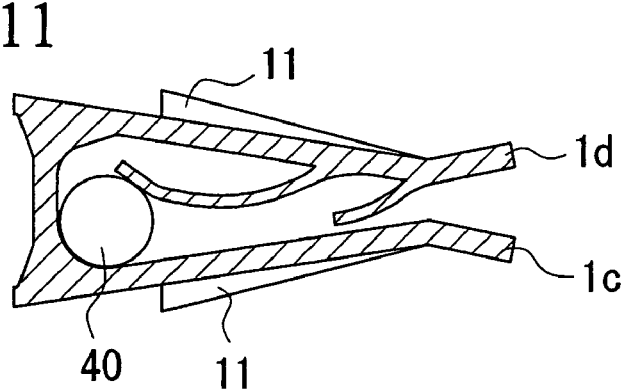
FIG. 11 is a cross-sectional view along the line XI–XI' of FIG. 10.

Next, the construction of a linear object identification tag according to a second embodiment of the present invention is described, with reference to FIG. 9 to FIG. 11. Because this linear object identification tag 10A is the same as the linear object identification tag according to the aforementioned first embodiment except that a guiding part 11, described later, is provided; description of the same parts is omitted.

In FIG. 9, the identification tag 10A is a clip body having: the clip parts 1c and 1d the same as the aforementioned clip parts 1a and 1b, the base part 6A the same as the aforementioned base part 6, and the identification denotation 15A the same as the identification denotation 15. Moreover, two protruding wedge-shaped guiding-parts 11 are provided on the outer face of the clip part 1c along the direction orthogonal to the inner face of the base part 6A. Each of guiding parts 11 extend in the direction described above while maintaining the spacing W11.

FIG. 10 shows the appearance of the identification tag 10A when seen from the clip part 1d side. In this diagram, a holding part 8A and anti-disengagement tongue pieces 9A are provided on the clip part 1d in the same way as the aforementioned clip part 1b. Moreover, two guiding parts 11 are provided on the outer face of the clip part 1d in the position corresponding to the outer face of the clip part 1c in the same way.

FIG. 11 is a cross-sectional view along the line XI–XI' of FIG. 10, with the guiding parts 11 provided in the position corresponding to the outer faces of each of the clip parts 1c and 1d.

Next, the function of the guiding parts 11 is described with reference to FIG. 12 to FIG. 14. These guiding parts 11 are needed when housing the linear object identification tag 10A inside the following installation instrument 20A.

Figure 12:
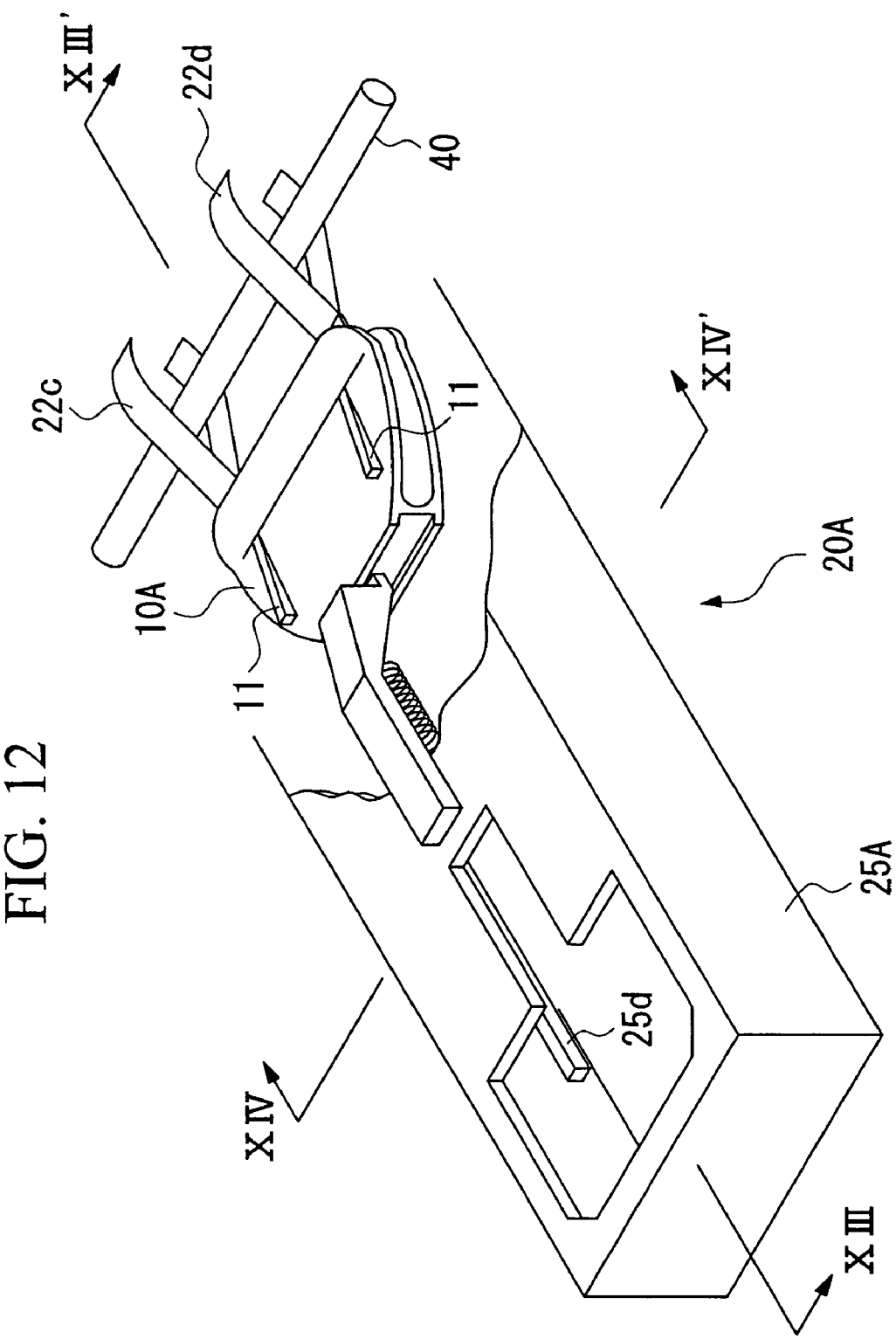
FIG. 12 is another perspective view showing the installation instrument for the linear object identification tag of the present invention.
Figure 13:
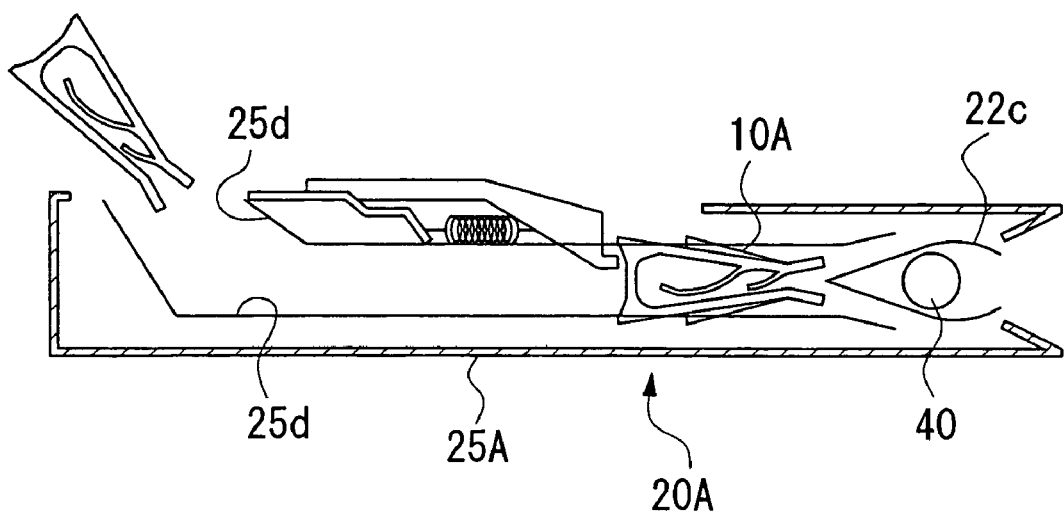
FIG. 13 is a cross-sectional view along the line XIII–XIII' of FIG. 12.

FIG. 12 shows the construction of the installation instrument 20A, and FIG. 13 is a cross-sectional view along the line XIII–XII' of FIG. 12. Because the installation instrument 20A is same as the aforementioned installation instrument 20, except for a shoulder part (slide member) 25a, which guides the guiding parts 11, provided inside the case 25A instead of the slide rails of the installation instrument 20; description of the same parts is omitted.

Figure 14:
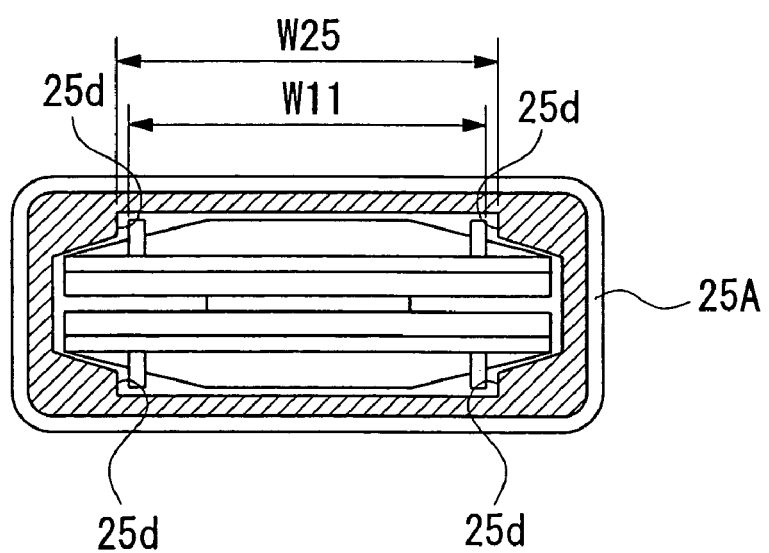
FIG. 14 is a cross-sectional view along the line XIV–XIV' of FIG. 12.

FIG. 14 is a cross-sectional view along the line XIV–XIV' of FIG. 12. In this diagram, the inner wall of the case 25A has a cross sectional shape substantially analogous to, and having a rather larger contour than, the cross-sectional shape of the identification tag 10A. Moreover, the shoulder parts 25d that integrate with the guiding parts 11 are formed in the four corners of the inner walls, and each of the shoulder parts 25d extends along the longitudinal direction (the direction toward the rear from the foreground of FIG. 12) of the case 25A and reaches near the opening guide parts 22c and 22d. Also, the horizontal distance W25 in a lateral direction between the two shoulder parts 25d is slightly greater than the spacing W11 of the guiding parts. Because of this, after the identification tag slides inside the case 25A along the shoulder parts 25d by way of the guiding parts 11, it is directed to the opening guides 22c and 22d and then the clip parts open. Specifically, in the second embodiment, sliding the identification tag inside the installation instrument is carried out by the guiding parts, and its opening is carried out by the wide part of the clip parts.

Next, the construction of a linear object identification tag according to a third embodiment of the present invention is described with reference to FIG. 15 and FIG. 16. Because this linear object identification tag 10B is same as the linear object identification tag according to the aforementioned first embodiment, except that the contour shape of the clip part is different, the linear object housing aspect is different, and the clip part is not hollowed out, description of the parts which are the same is omitted.

Figure 15:
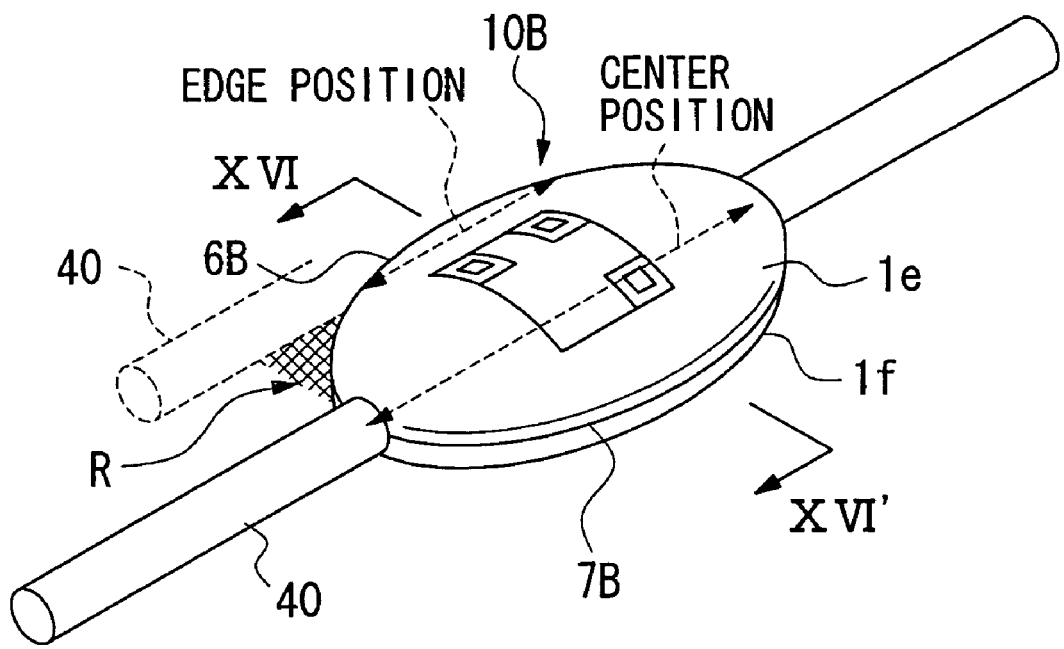
FIG. 15 is a perspective view showing a linear object identification tag according to a third embodiment of the present invention.

In FIG. 15, the identification tag 10B has a clip shape having clip parts 1e and 1f, which are substantially the same as the aforementioned clip parts 1a and 1b, and a base part 6B, which is substantially same as the aforementioned base part 6. Here, when seen from the plane face side, each of the clip parts 1a and 1b has an elliptical shape contour which becomes widest in the center position (the middle point on the line between the aperture part 7B and the base part 6B) of the diagram. In other words, the contour of each clip part 1a and 1b has a spindle shape with the line along the center position as a central axis. The contour of the clip part may be constructed with curved lines, apart from the aforementioned spindle shape. A streamlined shape, for example, may be employed. If the contour of the clip part is made as just described, the clip part does not have any corners or protrusions, so that even in cases where the identification tag is installed in a position where a number of linear objects are provided at high density, situations in which the identification tag gets tangled with the linear objects or other identification tags, can be suppressed.

Incidentally, even if the contour of the clip part is constructed with curved lines, the entanglement mentioned above may occur depending on the installation position of the linear object. For example in the case of the identification tag 10B, if the linear object is installed along the center position in the diagram (central axis of the spindle shape), the linear object and the clip part link smoothly without forming any recess which may cause entanglement, where the two join. On the other hand, when the linear object is installed along the edge (the edge position in the diagram) of the clip part for example, a recess area (cross hatching part in the diagram) R is formed between the linear object and the clip part, and other linear objects may get stuck on this part. Therefore this embodiment effectively prevents other linear objects and the identification tags from getting tangled by installing the linear object as shown in FIG. 16 below.

Figure 16:
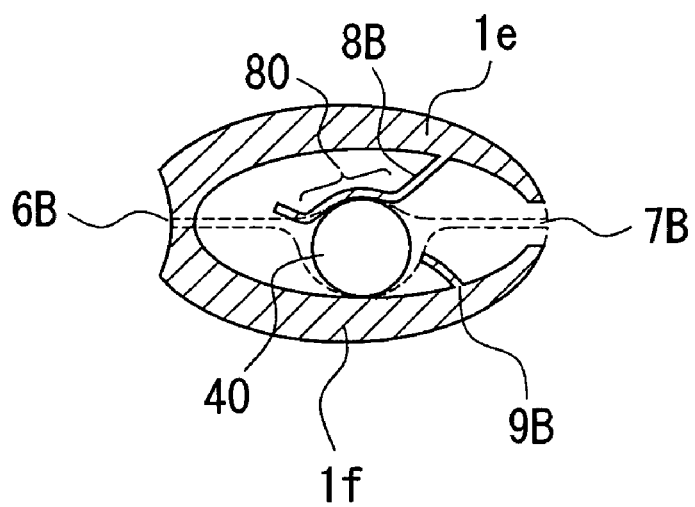
FIG. 16 is a cross-sectional view along the line XVI–XVI' of FIG. 15.

FIG. 16 is a cross-sectional view along the line XVI–XVI' of FIG. 15. In this diagram, the holding part 8B is provided on the inner face of the clip part 1e, and the anti-disengagement tongue pieces 9B are provided on the inner face of the clip part 1f. The anti-disengagement tongue pieces 9B have the same construction as the aforementioned anti disengagement tongue pieces 9. On the other hand, a hollow 80 having a semicircular cross section is formed near the center of the holding part 8B, and the periphery of the linear object 40 coincides with this hollow 80. Therefore, in the situation in which the linear object 40 is held in the hollow 80 by the force of the holding part 8B, it is locked on the inner face side of the position along the center part of the clip part 1f. By this means, the linear object 40 is installed along the central axis of each of the clip parts 1e and 1f, so that the effect of preventing the aforementioned entanglement can be achieved. In this embodiment, the end edge parts of each of clip parts 1e and 1f except for the part near the center position are made to engage tightly to each other (the broken line in FIG. 16), so that the linear object installed in the center position of each clip part does not slip easily to the edge.

Figure 17:
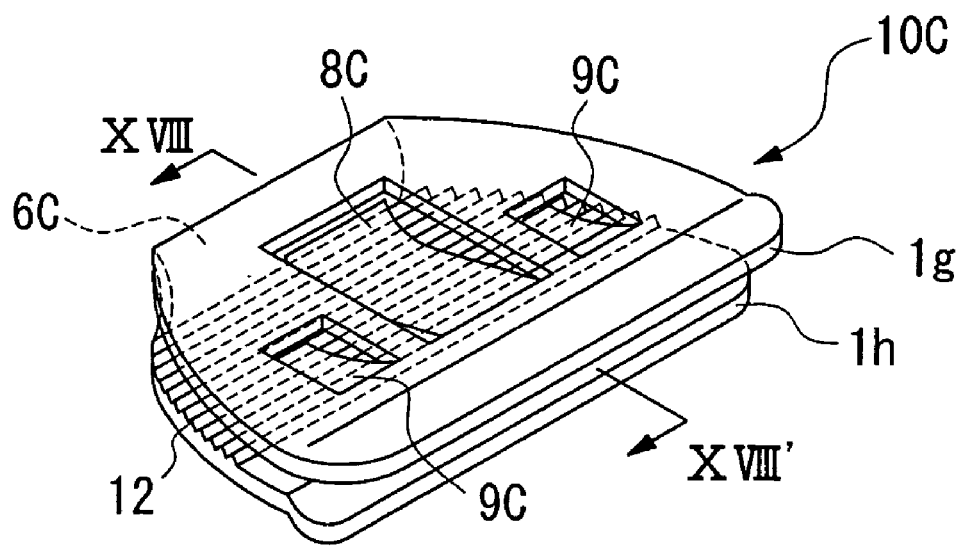
FIG. 17 is a perspective view showing a linear object identification tag according to the fourth embodiment of the present invention.
Figure 18:
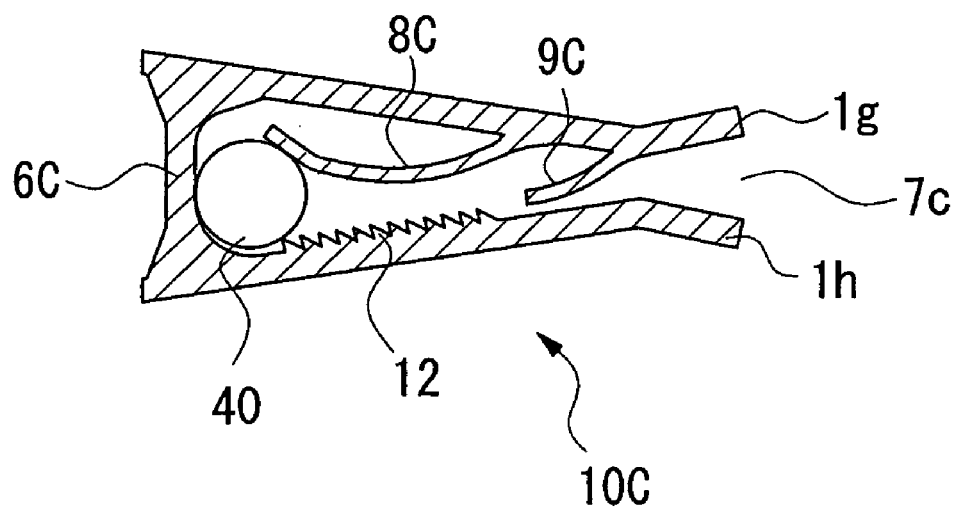
FIG. 18 is a cross-sectional view along the line XVIII–XVIII' of FIG. 17.

Next, the construction of a linear object identification tag according to a fourth embodiment of the present invention is described, with reference to FIG. 17 and FIG. 18. Because this linear object identification tag 10C is same as the aforementioned linear object identification tag 10, according to the first embodiment, except that it has a rough surface 12 provided on the inner face of the clip part 1h, description of the parts which are the same is omitted.

In FIG. 17, a linear object identification tag 10C is a clip body having clip parts 1g and 1h which are substantially the same as the clip parts 1a and 1b, and a base part 6C which is substantially same as the base part 6. A holding part 8C and anti disengagement tongue pieces 9C which are the same as in the case of the identification tag 10, are provided on the inner face of the clip part 1g. On the other hand, a rough surface 12 is provided on the inner face of the clip part 1h. This rough surface 12 has a large number of protrusions protruding from the inner face of the clip part 1h. Especially in this example, a large number of ridges extending in parallel with the longitudinal direction of the linear object installed in the tag are provided.

FIG. 18 is a cross-sectional view along the line XVII-I–XVIII' of the FIG. 17. In this embodiment, the cross section of the rough surface 12 orthogonal to the longitudinal direction of the linear object 40 has a saw tooth shape, and the saw tooth is formed to have its vertical face facing toward the base part 6C side and its oblique face facing toward the aperture 7c, in order that the linear object 40 taken in through the aperture part 7c does not move toward the direction of the aperture part 7c. The corrugation of the rough surface 12c is not limited to the example described above, and a large number of individual prongs or checkered slots may also be formed.

When the saw tooth rough surface 12 is formed as described above, the linear object installed on the identification tag can easily be slid in the longitudinal direction. That is, because only the protrusion parts of the rough surface 12 make contact with the linear object, the friction with the linear object 40 is reduced. Moreover, because the rough surface 12 has a large number of protrusions extending in the longitudinal direction of the linear object, the identification tag can easily be moved along the longitudinal direction of the linear object, but the movement in any other direction is restricted. Therefore, when moving the linear object from the installation position, problems such as the linear object slipping in other directions than the longitudinal direction (the direction toward the aperture part, for example), the linear object becoming oblique to the identification tag, or the linear object being bent inside the identification tag due to its disengagement, can be prevented. Furthermore, because the linear object can be easily moved in the longitudinal direction as described, it becomes easy for example to move the identification tag to a predetermined position after the identification tag is installed in a position where the operation of installation of the linear object is easy, or the identification tag can be easily moved to a position where the identification denotation can be easily read after installation.

Figure 19:
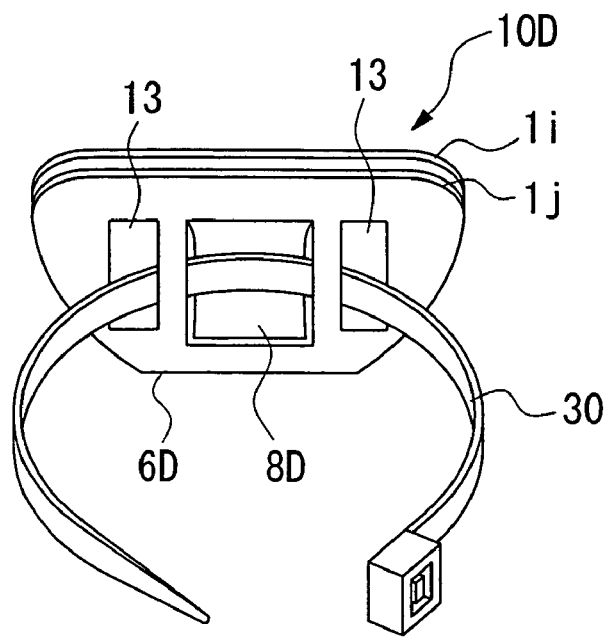
FIG. 19 is a perspective view showing a linear object identification tag according to a fifth embodiment of the present invention.
Figure 20:
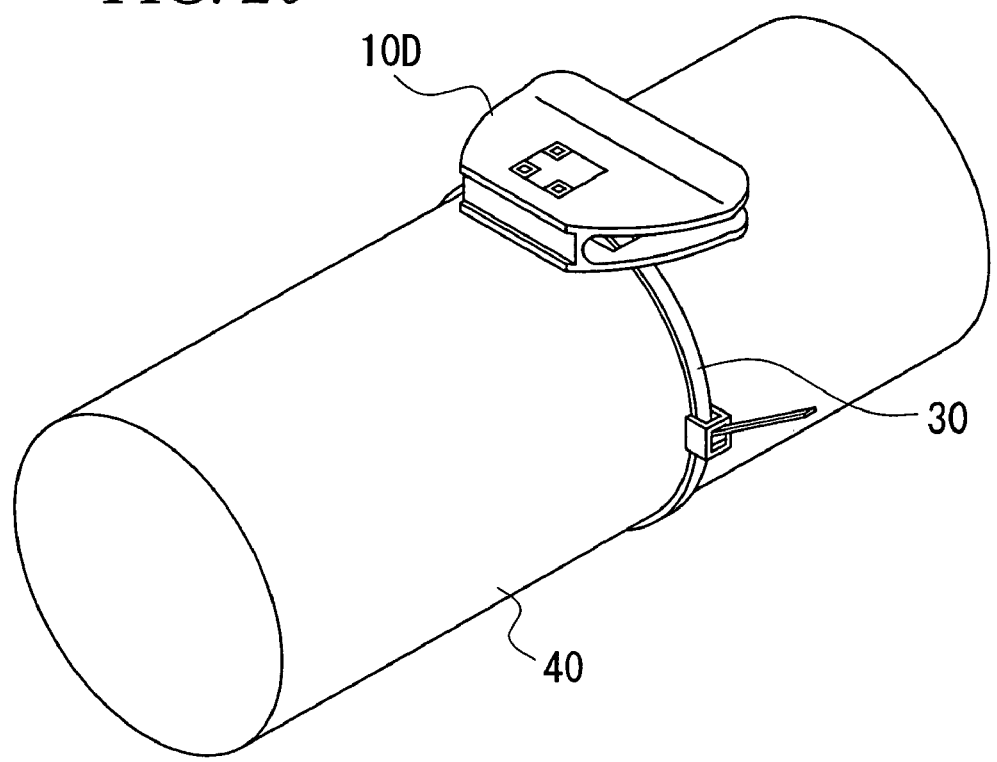
FIG. 20 is a perspective view showing a linear object identification tag fastened to a linear object.

Next, the construction of a linear object identification tag according to a fifth embodiment of the present invention is described, with reference to FIG. 19 and FIG. 20. Because this linear identification tag 10D is same as the aforementioned linear object identification tag 10 according to the first embodiment except that it has two band holes 13 provided on the clip part 1j, description of parts which are the same is omitted.

In FIG. 19, because the linear object identification tag is a clip body having the clip parts 1i and 1j substantially the same as the clip parts 1a and 1b and the base part 6D substantially same as the base part 6, its description is omitted. Usually, the linear object 40 is housed inside a tag constructed with these parts. However, if the diameter of the linear object is exceedingly large, the linear object identification tag of the present invention may not be able to cope with this. This embodiment enables the installation of the identification tag to a linear object with a large diameter in such circumstances. That is to say, a band 30 is passed through the two band holes 13 provided on the clip part 1j. Then as shown in FIG. 20, this band is laid around the periphery of the linear object 40, and the identification tag is tightened and fixed to the linear object 40. The form of the band holes 13 is not especially limited, and slit holes as shown in FIG. 20, round holes or similar may be appropriate. Also, the number of the band holes 13 may be two or more.

Figure 21:
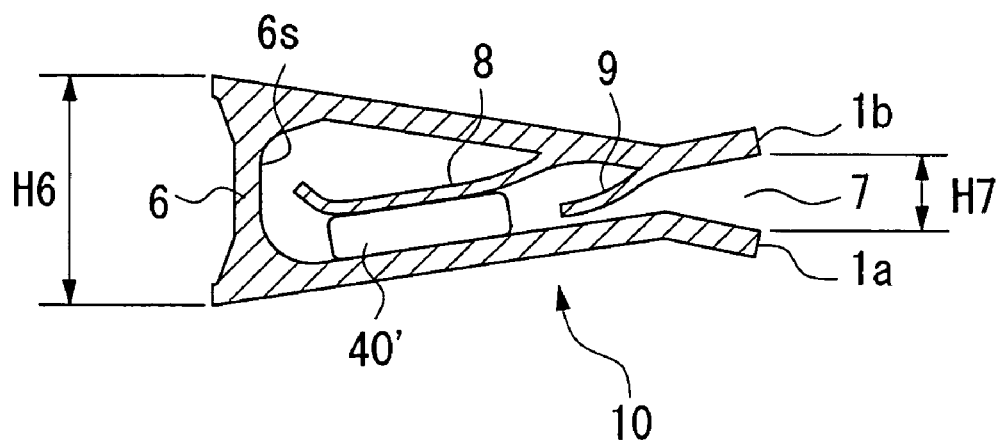
FIG. 21 is a diagram illustrating an aspect of where a linear object identification tag of the present invention is installed onto a linear object of rectangular section.

The present invention is not limited to linear objects having a semicircular cross section, and a linear object 40' having a rectangular cross section as shown in FIG. 21 is also possible. In short, as long as it can be housed in the internal space constructed with the base part and clip parts of the identification tag, the form (including cross sectional shape) of the linear object does not matter.

Figure 22:
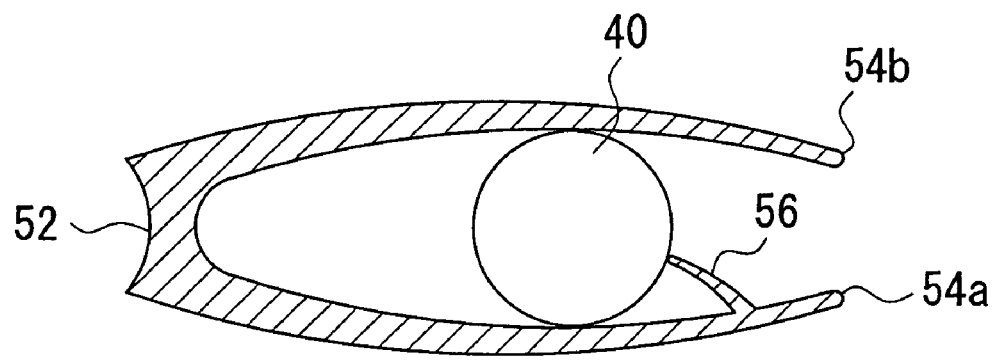
FIG. 22 is a cross-sectional view showing a linear object identification tag of another embodiment of the present invention.

Also, as shown in FIG. 22, the linear object identification tag of the present invention may have a construction having only an anti-disengagement tongue piece 56 as the holding part without having a pressing part. The tag of this embodiment has a clip body with a U-shape cross section having both edges 54a and 54b of a curved plate-shaped clip part openably joined at a base part 52. On the inner face of the clip part 54a, the anti-disengagement tongue piece 56 is formed, which protrudes from this inner face. In this embodiment, the maximum separation distance between the clip parts 54a and 54b is made somewhat smaller than the diameter of the linear object 40, and consequently, the linear object 40 housed inside the clip parts 54a and 54b is elastically pinched by the clip parts 54a and 54b and held. The construction of the anti-disengagement tongue piece 56 is same as that of the aforementioned embodiment, and when the linear object 40 is inserted by opening the clip parts 54a and 54b, the anti-disengagement tongue piece 56 is elastically depressed, and once the linear object 40 is taken properly into the tag, the linear object 40 is locked by the anti-disengagement tongue piece 56 and is prevented from disengaging from the tag. This embodiment has an advantage that the construction of the tab can be simplified and the production cost can be reduced due to the presser part not being provided.

Although a plurality of embodiments has now been described, the present invention is not considered limited to each of the above mentioned embodiments, and each of the embodiments may be appropriately modified within the scope of the technical concept of the present invention. For example, although in the aforementioned embodiment, the case in which the linear object identification tag is made of elastic material and the clip parts resiliently open with the base part as a supporting point is described, a clip part made of rigid material which is openable with the base part as a pivot is also possible.

Figure 23:
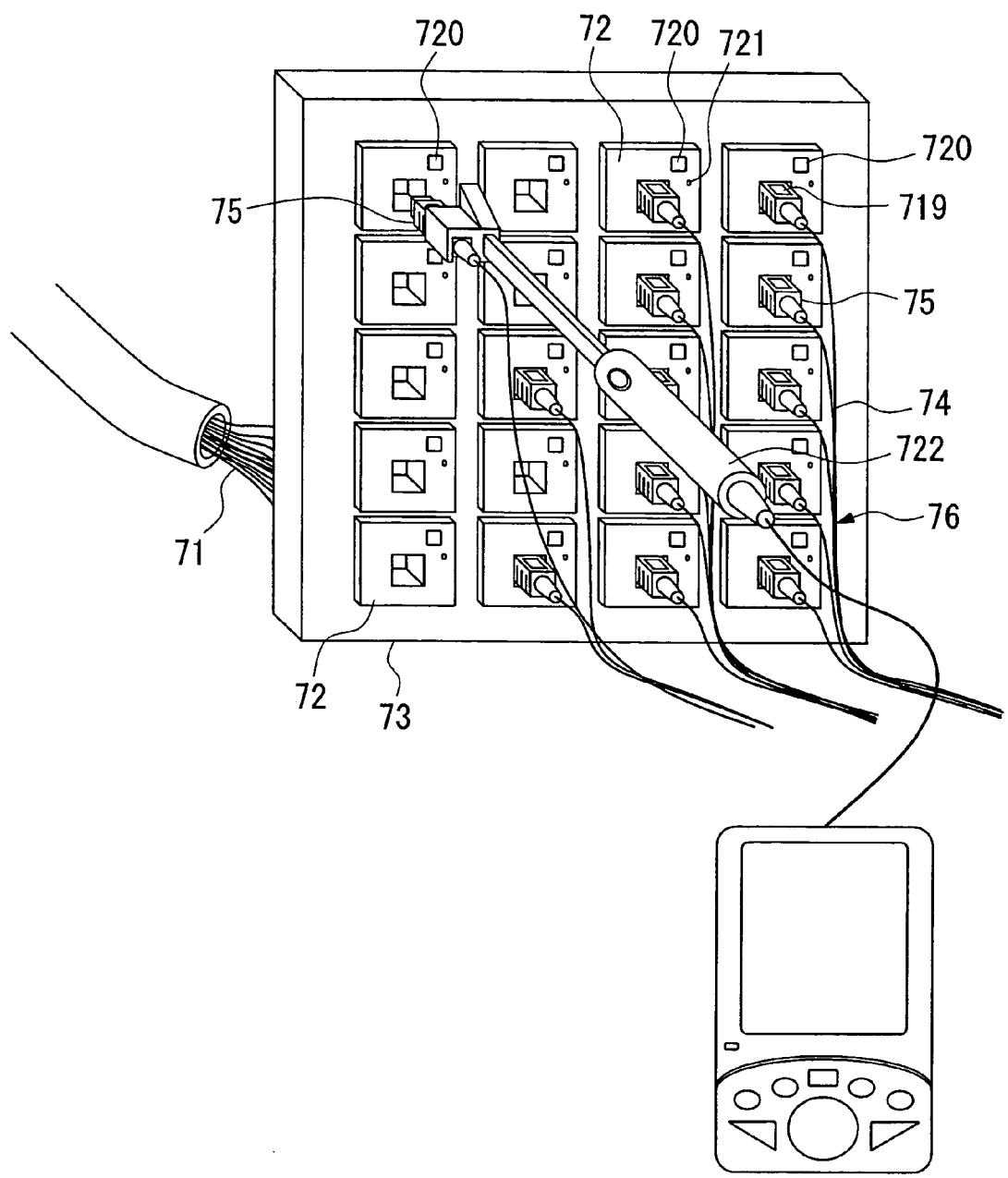
FIG. 23 is a perspective view showing an embodiment of a method for connector interconnection management according to the present invention.

Next, an embodiment of a method for connector interconnection management according to the present invention is described, with reference to FIG. 23.

Reference symbol 71 in the diagram denotes a communication line which links to a remote device. Connector receptacles 72 are connected respectively to the end of each communication line 71, and these connector receptacles 72 are arranged in a grid on the front face of the connector receptacle board 73. Reference symbol 74 denotes a communication line, which links communication devices in a communication equipment station, and reference symbol 75 denotes connectors provided at both ends of the communication line 74, and a communication line 76 including connectors is comprised of the communication line 74 and the connectors 75 at both of its ends.

By connecting a communication line 76 that has connectors to the connector receptacle 72 of the connector receptacle board 73, the remote device is connected to the device in the station via: the communication line 71, the connector receptacle 72 and the communication line 76 that has connectors. It becomes possible to freely switch the remote device connection to devices in the station having different functions, by changing the device in the station to which the connector 75 of the communication line 76 that has connectors is connected.

On the top face of each connector 75 is provided a label 719 that has a two dimensional code which is converted from the identification data identifying the connector 75; and that is attached to the outer surface of the connector.

On the front face of each connector receptacle 72 is attached a label 720 having a two dimensional code which is converted from the identification data identifying the connector receptacle 72.

An engagement protrusion part 721 is formed adjacent to the connector jack on the connector receptacle 72, and this engagement protrusion part 721 fits an engagement recess part 725 formed at the end of an connector interconnection instrument 722.

The connector interconnection instrument 722 of this embodiment has a connector grip part 716 having a pair of opposing pincers 716a to hold the connector 75.

Figure 24:
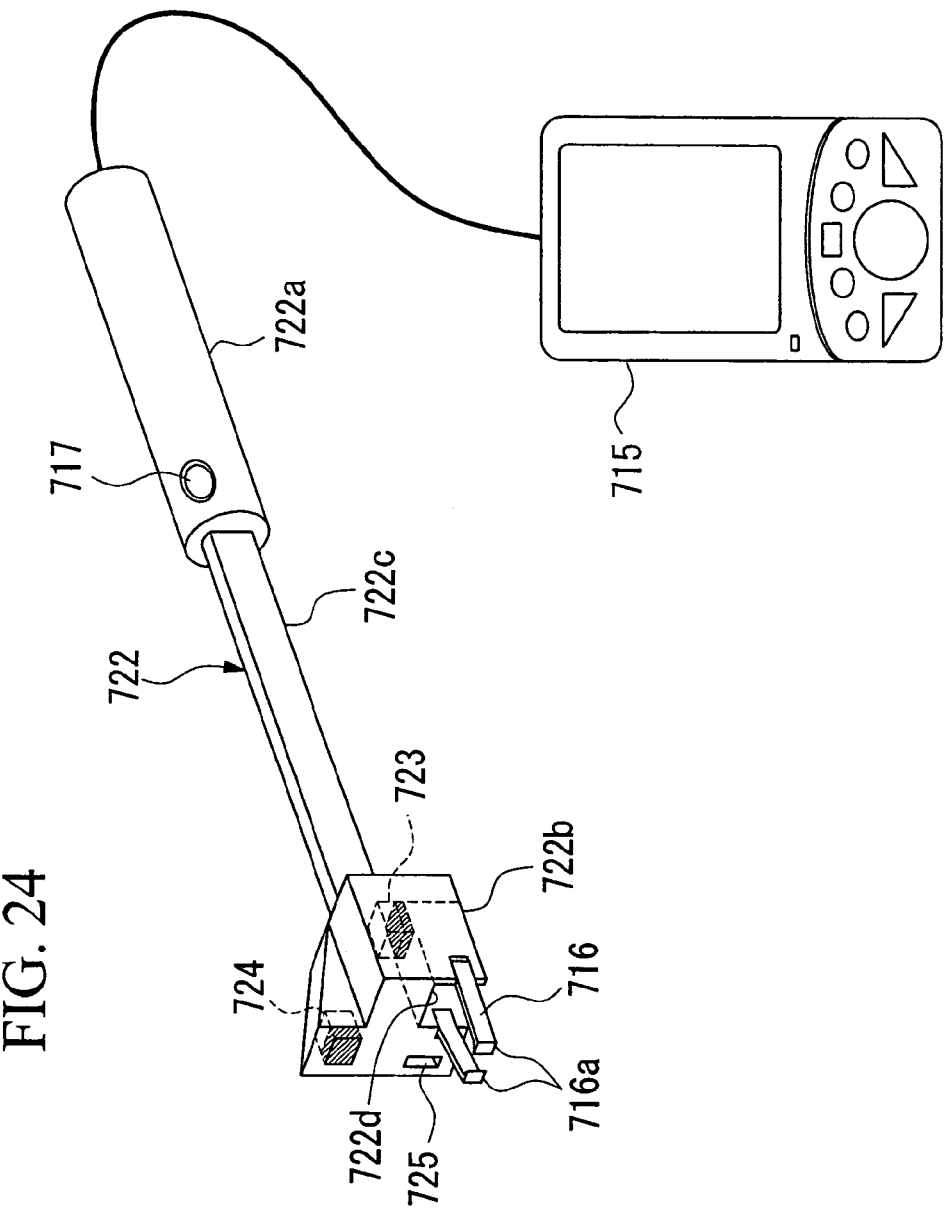
FIG. 24 is a perspective view showing an embodiment of a connector interconnection instrument of the present invention.

FIG. 24 is a perspective view showing the connector interconnection instrument 722 seen from the end side. The connector interconnection instrument 722 has a grip part 722a for the operator to grip, a head part 722b which has the connector grip part 716, and a shaft 722c which joins both parts. Between hooks 716a of the connector grip part, a solid rectangular cavity part 722d that houses the base end side of the connector 75 gripped by the hooks. 716a is formed inside the head part 722b. A control button 717 to control the opening and closing operation of the connector grip part 716 is provided on the side of the end part of the grip part 722a.

Reader parts 723 and 724 to read two dimensional codes are housed inside the head part 722b. The reader parts 723 and 724 both have: a lens which converges the image of a two dimensional code onto a CCD, a CCD which recognizes the image, and a decoder which decodes the two dimensional code recognized by the CCD.

The lens of the reader part 723 is provided at the bottom end (shown in hatching) of the reader part 723 and is exposed out of the ceiling face of the cavity part 722d, and when the connector 75 is gripped by the connector grip part 716 and housed in the cavity part 722d, it reads the connector information while facing the two dimensional code on the top face of the connector 75.

The lens of the reader part 724 is provided at the front end face side (shown in hatching) of the head part 722b, and when the connector interconnection instrument 722 approaches the connector receptacle board 73 for the connection and disconnection of a connector 75, the reader part 724 reads the connector receptacle information from the two dimensional code 720 of the connector receptacle 72.

A recessed engagement part 725, which engages with the protruding engagement part 721 of the connector receptacle 72 when the connector interconnection instrument 722 is pressed against the connector receptacle board 73 while connecting or disconnecting the connector 75, is formed on the front end face of the head part 722b of the connector interconnection instrument 722. A sensor, which mechanically detects whether or not the protruding engagement part 721 is engaged, is provided inside the recessed engagement part 725. Every time the operation of connection or disconnection of a connector 75 is carried out, this sensor detects whether or not the protruding engagement part 721 is engaged, and based on the signal from this sensor, the connector connection presence information, which indicates whether or not a connector 75 is connected, is retrieved from each connector receptacle 72.

A hand held device 715 is connected to the connector interconnection instrument 722. This hand held device 715 analyses the data, which the two dimensional code reader parts 723 and 724 read, and the connector connection presence information retrieved from the sensor inside the recessed engagement part 725, and stores them in a memory.

A method for connecting the connector 75 to the connector receptacle 72 is described. When the connector 75 is connected to the connector receptacle 72, firstly, the connector 75 is inserted into the cavity part 722d of the connector interconnection instrument 722, and then the control button 717 of the connector interconnection instrument 722 is pressed to close the connector grip part 716 and grip the connector 75.

As the control button 717 is pressed, the two dimensional code reader part 23 reads the two dimensional code 719 on the surface of the connector 75, decodes it, and then transmits it as a connector identification data to the hand held device 715 to record it. When the connector interconnection instrument 722 approaches the connector receptacle 72 gripping the connector 75, the two dimensional code reader part 724 reads the two dimensional code 720 of the connector receptacle 72, decodes it, and then transmits it as a connector receptacle identification data to the hand held device 715 to record it.

When the connector 75 is inserted into the connector receptacle 72, the recessed engagement part 725 of the connector interconnection instrument 722 engages with the protruding engagement part 721 of the connector receptacle 72. At this point, if the connector receptacle 72 had been recorded in the hand held device 715 as being connection present, then it is judged as being connection free, and on the other hand, if it had been recorded as being connection free, then it is judged as being connection present, and it is recorded as connector connection presence information to the memory in the hand held device 715. With this engagement detection of the recessed and protruding parts, information recorded in the hand held device is transmitted to a management computer (not shown in the diagram) at the same time via a wired or wireless device for communication.

In this way, according to the connector interconnection management method using: the connector 75 shown in FIG. 23, the connector receptacle board 73, and the connector interconnection instrument 722 shown in FIG. 24, it becomes possible to accurately retrieve the connector identification data, connector receptacle identification data and connector connection presence data while carrying out a series of operations of connecting and disconnecting the connectors 75. Hence the connector interconnection status can be accurately managed.

Also, because the series of operations can be carried out using a single connector interconnection instrument 722 without a plurality of instruments having to change hands, it becomes possible to carry out the operations while facing and verifying the connector 75 or the connector receptacle 72 at all times, and concerns of incorrectly connecting or disconnecting the connector 75 can be reduced, and also the efficiency of the operations can be greatly improved.

In the embodiment of FIG. 23, although the labels 719 and 720 provided on the connector 75 and connector receptacle 72 are two dimensional codes, the labels 719 and 720 may be a symbol, color bar or barcode, and also they may be a writable semiconductor memory or wireless tag. If a barcode is used, the reader parts 723 and 724 of the connector interconnection instrument 722 are constructed with barcode reader parts, and if the semiconductor memory or wireless tag is used, they may be constructed with a transmitting receiving part having reading functions for them as well as writing functions.

Especially when two dimensional code, semiconductor memory, wireless tag or so forth, which allow large information, are used as a label, not only the identification data of each of the connectors or connector receptacles as described in the aforementioned embodiment, but also the model number, specification, manufacturer name and production lot number of each of the connectors or connector receptacles may be recorded as ancillary data, and moreover, ancillary data such as the model number, specification, manufacturer name and production lot number of the communication lines connected to each of the connectors or connector receptacles may be added. By displaying these ancillary data on the hand held device, it becomes possible for the operator at a work site to operate and make judgments, having instantly recognized much information. Hence a reduction of operation mistakes and improvement of operation efficiency can be achieved. Furthermore, when a rewritable semiconductor memory or wireless tag are used, because it becomes possible to record and update variable data such as the date on which the operation of connector connection and disconnection are carried out, and the name of the operator as ancillary data, more detailed management can be realized.

Also, for the method of recording the identification data and ancillary data to the label 719 and 720, a method may be employed in which each of the labels 719 and 720 are made to possess only an independent unique symbol or digit, and the symbol or digit of the labels 719 and 720 are read with the connector interconnection instrument 722, and then the identification data and ancillary data are associated with the read symbol or digit by the hand held device 715 connected to the connector interconnection instrument 722. In this case, compared to the case in which the labels 719 and 720 are assigned beforehand with the identification data and ancillary data including detailed information of the connector 75 or the connector receptacle 72, and are installed on the corresponding connector 75 or the connector receptacle 72, it becomes possible to randomly install the labels 719 and 720 on the connector 75 or the connector receptacle 72. Also, even if the label is lost, another label can be installed and used, so that workability of the label installation is drastically improved. Furthermore, since only labels for which their independence is ensured need be manufactured, there is an advantage in that the labels can be manufactured inexpensively.

When a semiconductor memory or wireless tag are provided on the connector 75 and the connector receptacle 72, their operation power supply is preferably maintained by the connector interconnection instrument 722. Specifically, the power may be supplied by means of excitation of electromagnetic induction from the connector interconnection instrument, or it may be supplied at the point in time when the connector interconnection instrument 722 contacts the connector receptacle board 73, directly through the contact point. Consequently, there is an advantage in that the semiconductor memory or wireless tag as a label can be constructed compact and inexpensively.

In the embodiment of FIG. 24, the connector connection presence information was detected and retrieved by means of engagement of the protrusion and recessed parts 721 and 725 while connecting and disconnecting the connector 75. However this can be modified as shown in FIG. 25.

Figure 25:
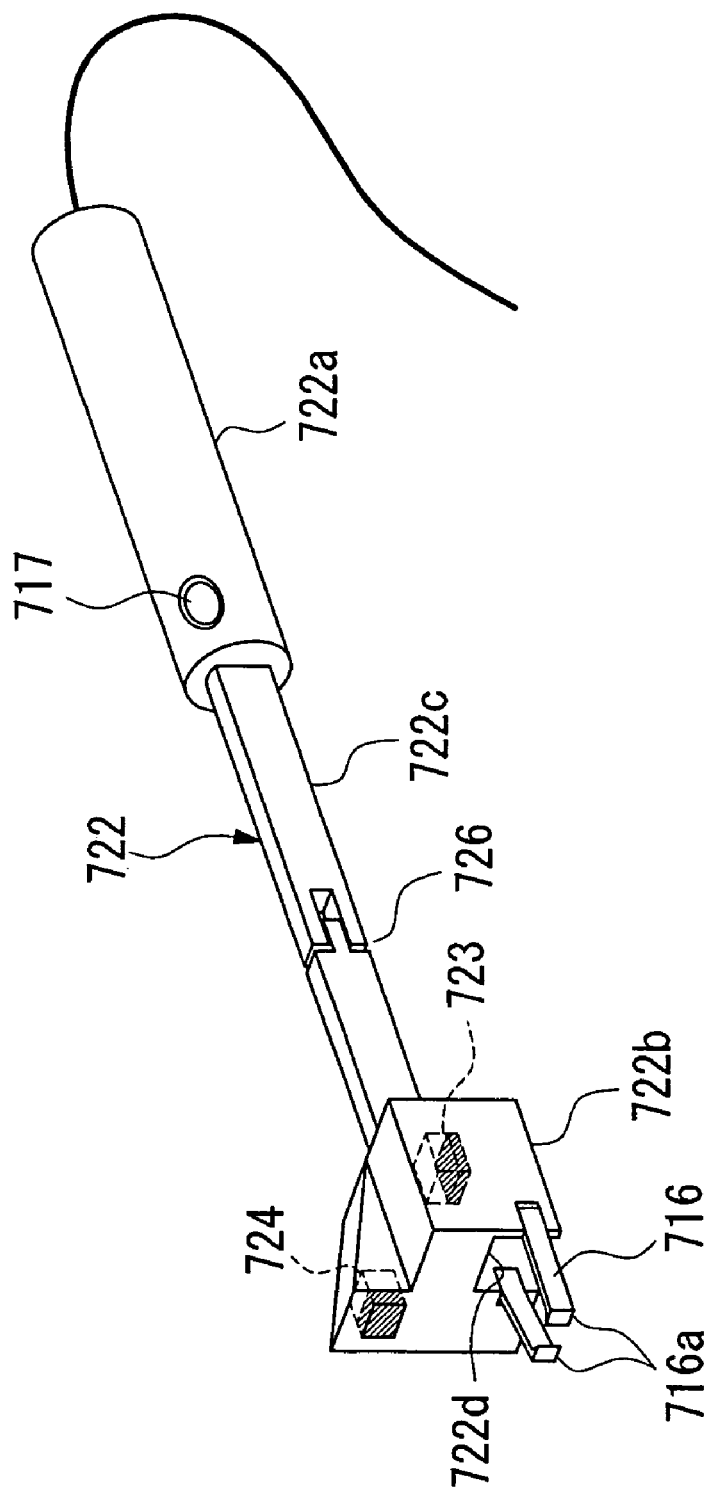
FIG. 25 is a perspective view showing a second embodiment of a connector interconnection instrument.

FIG. 25 shows a second embodiment of the connector interconnection instrument 722. In this embodiment, a stress detecting sensor 726, which detects the variation and direction of axial mechanical stress of the shaft 722*c*, is provided in the middle of the shaft 722*c*. The stress detecting 726 determines the direction and variation of the stress applied in the axial direction of the connector interconnection 722, detects connecting and disconnecting operations, and retrieves the connector connection presence information. According to this method, a distinction between connection and disconnection can be accurately detected from the direction of the stress.

Also, not only the mechanical variation described above, but also electrical variation such as electrostatic capacity or electromagnetic field when the connector 75 is connected or disconnected to or from the connector receptacle 72, or optical variation such as of reflection light, may be detected by various types of sensor, and the connector connection presence information thus retrieved. In this case, the sensor is provided in the connector interconnection instrument 722 or the connector receptacle 72.

Figure 26:
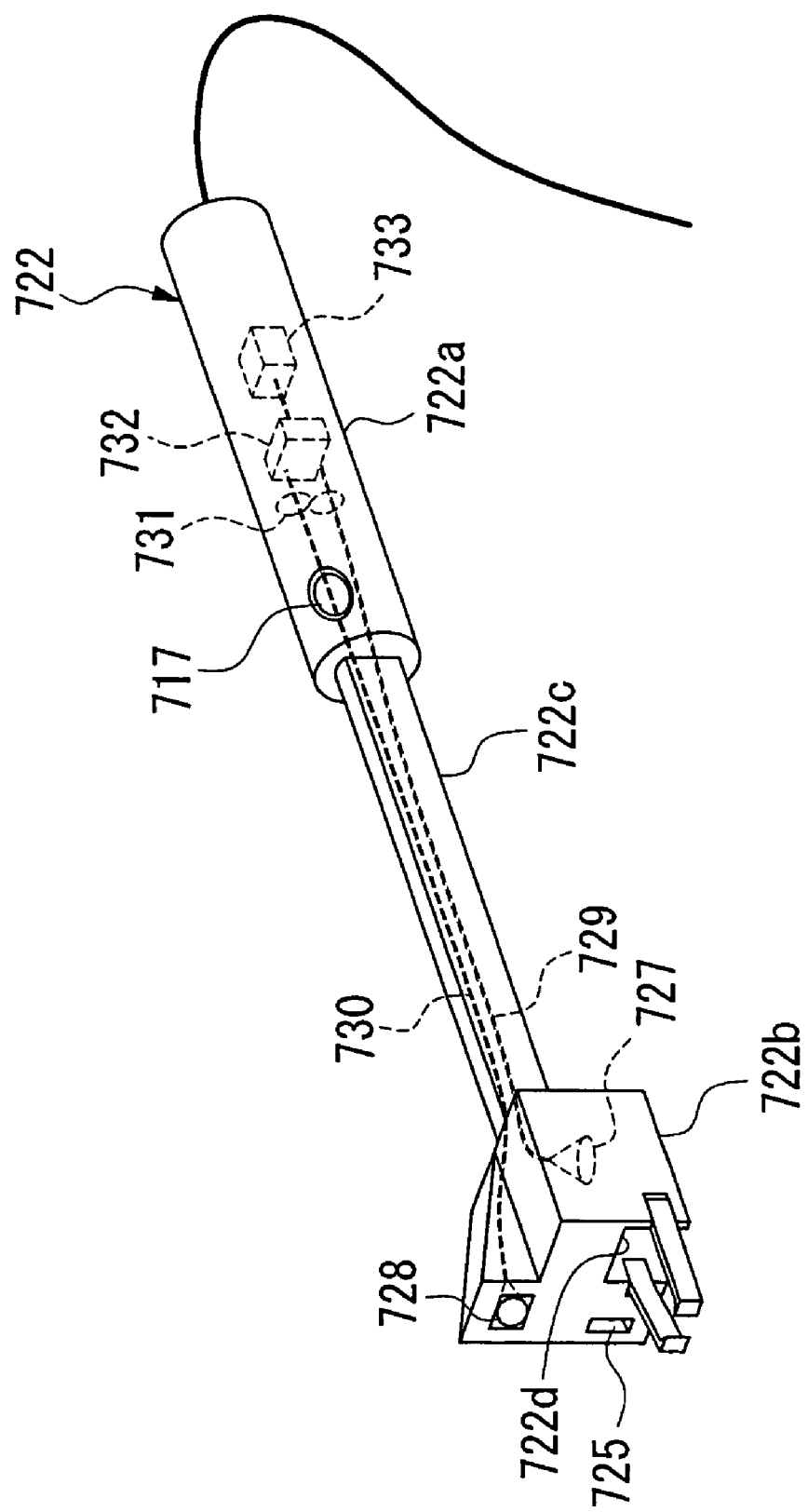
FIG. 26 is a perspective view showing a third embodiment of a connector interconnection instrument.

FIG. 26 shows another embodiment of a connector interconnection instrument of the present invention. In this embodiment, lenses 727 and 728 respectively corresponding to the labels 719 and 720 are provided, and the images converged by these lenses 727 and 728 are transmitted through a bundle of optical fibers 729 and 730. Images transmitted through each of optical fiber bundles 729 and 730 are formed on a CCD 732 by a lens 731. The output signal from the CCD 732 is transmitted to a decoder 733, and the decoder 733 decodes the recognized image.

In this embodiment, because only the lenses 727 and 728 to converge images on optical fiber bundles 729 and 730 need be provided at the end of the connector interconnection instrument 722, and the CCD 732 and the decoder 733 can be provided inside the grip part 722a, it becomes possible to construct the end of the connector interconnection instrument compact. Hence, when the connector receptacle 72 is provided at high density, operationality and operating efficiency can be improved.

Figure 27:
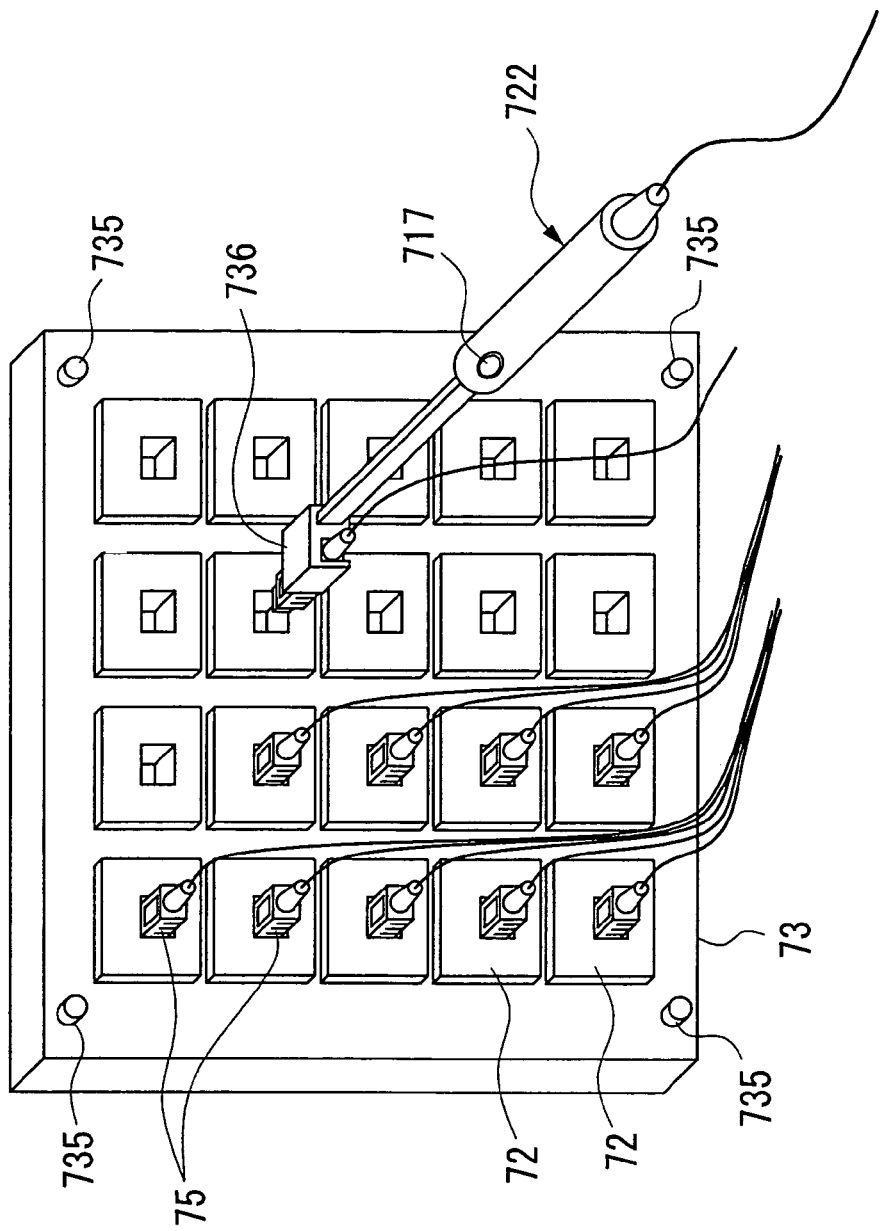
FIG. 27 is a perspective view showing another embodiment of a connector terminal strip and connector interconnection instrument of the present invention.
Figure 28:
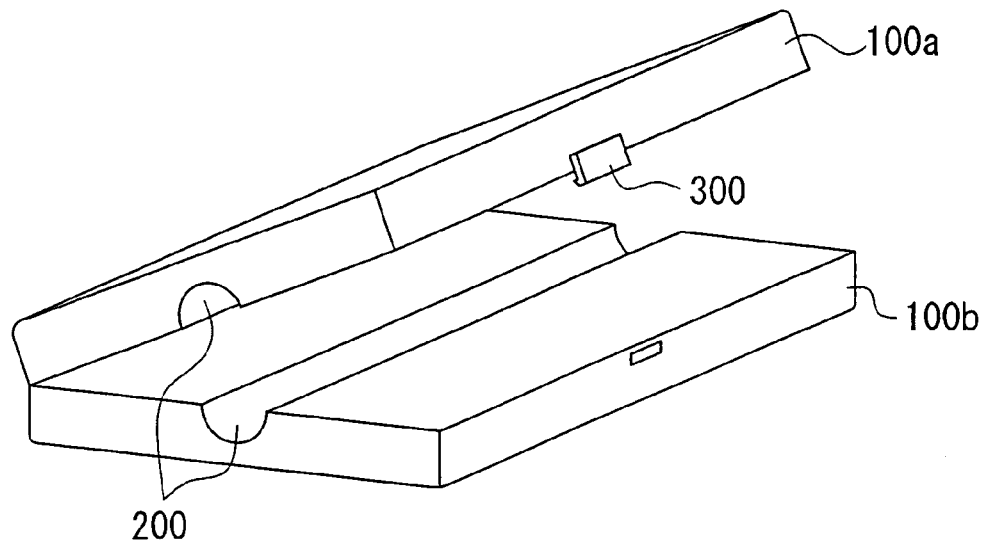
FIG. 28 is a diagram showing a conventional identification tag.
Figure 29:
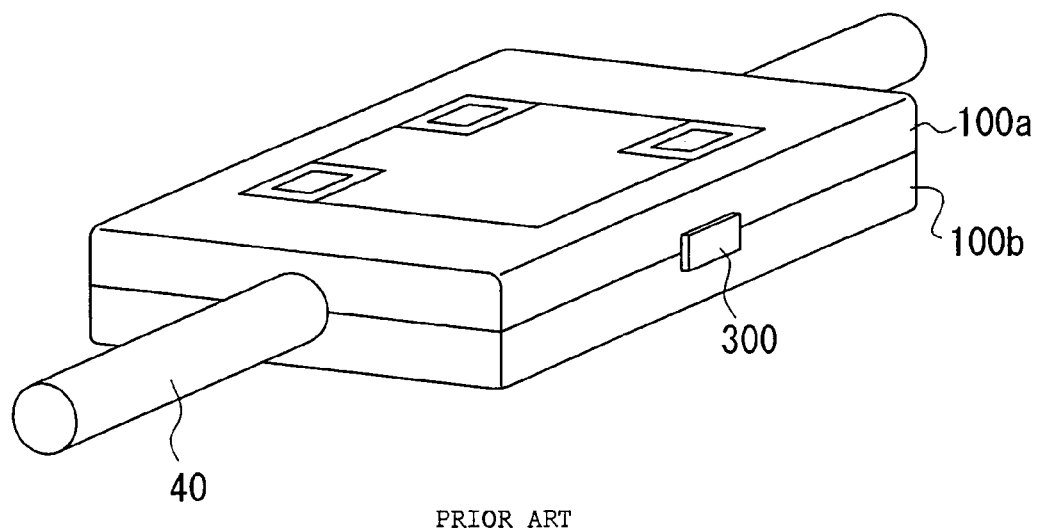
FIG. 29 is a diagram showing a conventional identification tag installed onto a linear object.
Figure 30:
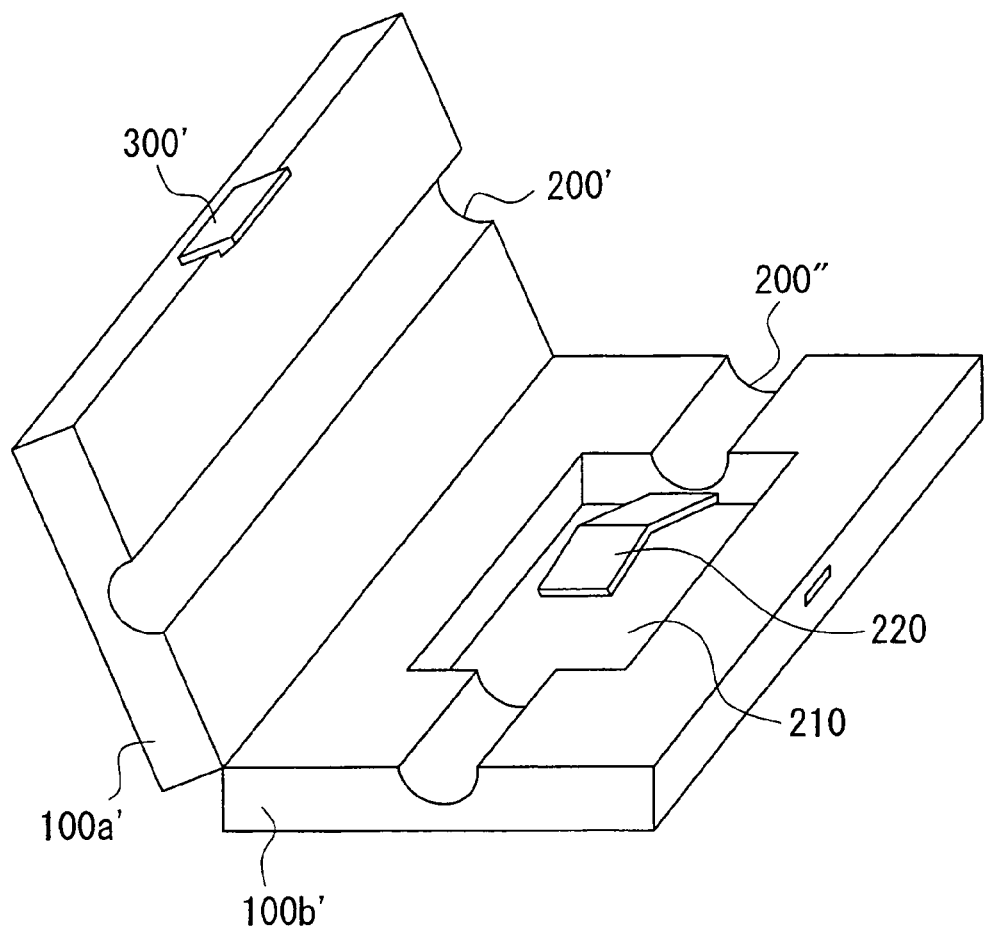
FIG. 30 is another diagram showing a conventional identification tag.
Figure 31:
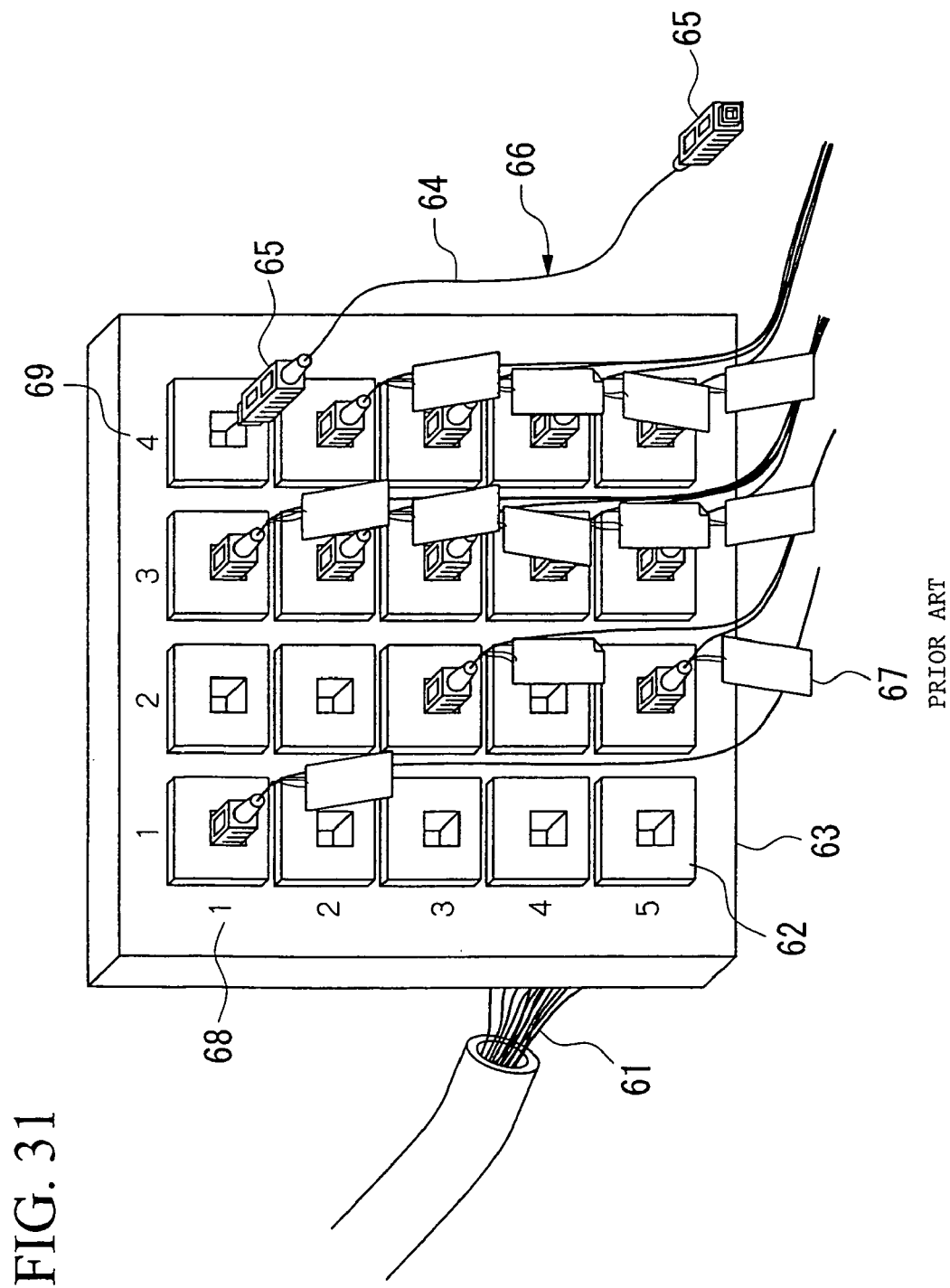
FIG. 31 is a perspective view describing a conventional method for connector interconnection management.
Figure 32:
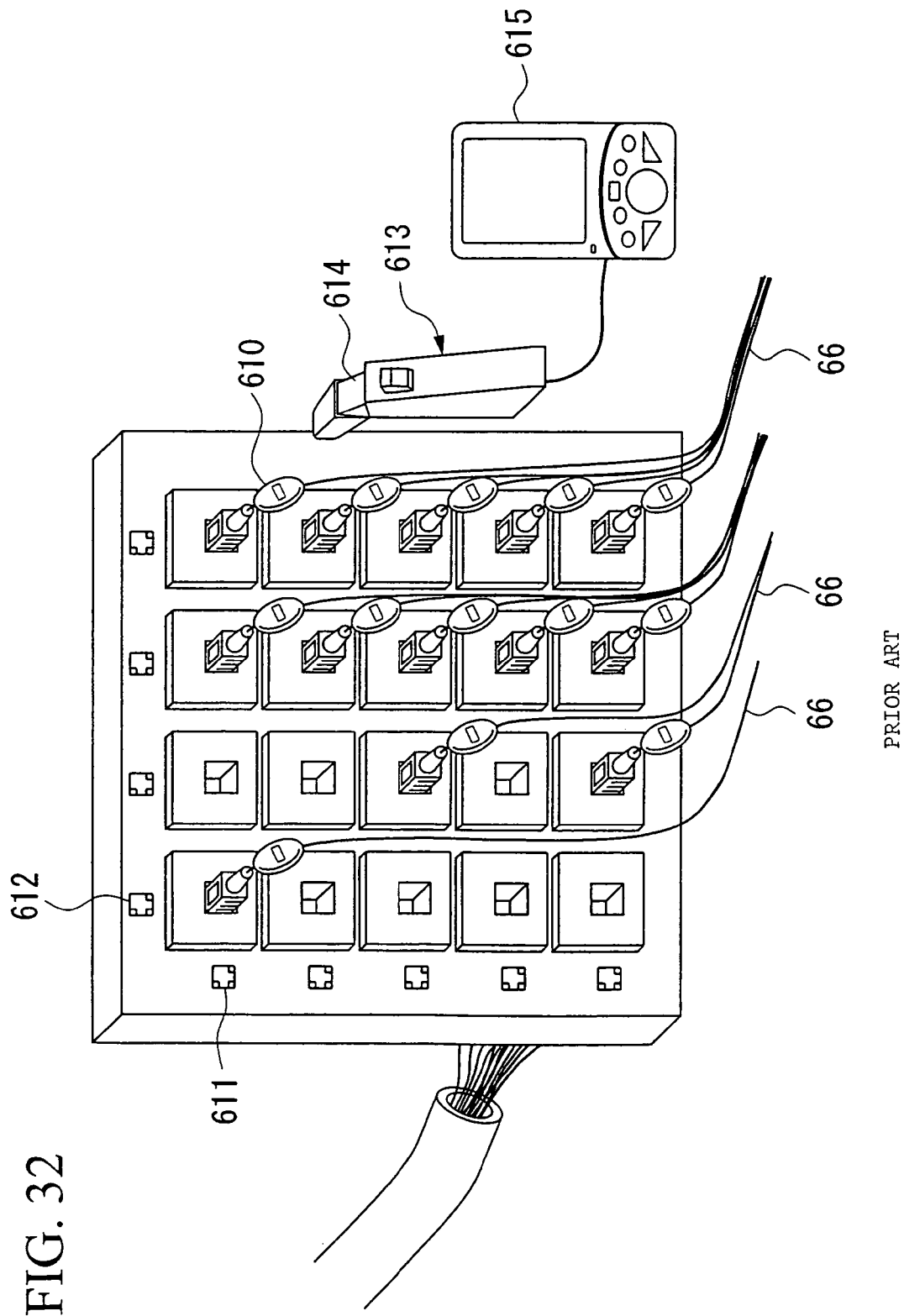
FIG. 32 is a perspective view showing another conventional method for connector interconnection management.
Figure 33:
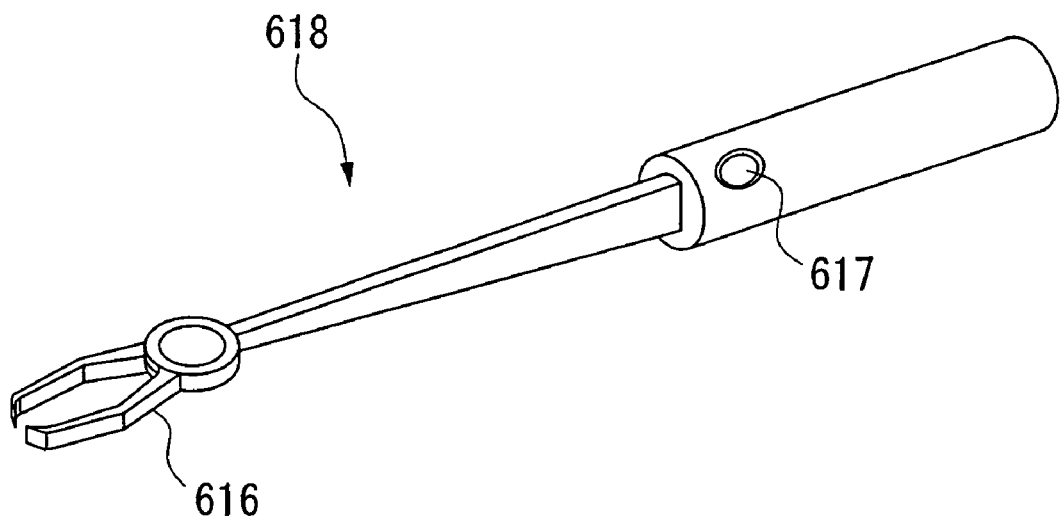
FIG. 33 is a perspective view showing a conventional connector interconnection instrument.

FIG. 27 shows another embodiment of the connector receptacle board 73 and the connector interconnection instrument 722 of the present invention. Reference symbols 735 denote wireless transmitter receiver parts provided on the front face of the connector receptacle board 73. In the case of FIG. 27, the wireless transmitter receiver parts 735 are provided at four corners of the connector receptacle board 73, and each of transmitted signals is different from each other. Also, a wireless transmitter receiver part 736 is provided in the connector interconnection instrument 722, and this receives transmitted signals from the wireless transmitter receiver parts 735 at the four corners.

In this embodiment, when the control button 717 is pressed to operate the connector grip part 716, in the same manner of the aforementioned embodiment, the sensor 723 reads the two dimensional code 719 provided on the surface of the connector 75, and the signal is transmitted from the wireless transmitter receiver part 736 at the same time. By the transmitted signal from the wireless transmitter receiver part 736, the four wireless transmitter receiver parts 735, which are in a receive state, of the connector receptacle board 73 become a transmit state, and each of the different signals are transmitted. The wireless transmitter receiver part 736 determines the position of the connector interconnection instrument 722 connected or disconnected, by separately determining the strength of the transmitted signal from the wireless transmitter receiver parts 735, or the propagation time of the transmitted pulse. Connector receptacle information associated with the connector receptacle 72 is read by identifying the position of the connector receptacle 72. Therefore, in this embodiment, a label having connector receptacle information recorded does not need to be provided for each connector receptacle 72.

In the embodiment of FIG. 27, the method of providing the wireless transmitter receiver parts 735 and 736 is illustrated. However, an acoustic wave transmitter receiver part which is able to transmit and receive acoustic waves (such as ultrasonic waves) may be provided in the connector receptacle board and the connector interconnection instrument instead, and the position may be detected by transmitting and receiving light such as infrared light.

INDUSTRIAL APPLICABILITY

The linear object identification tag according to the present invention is a linear object identification tag which can be attached to and detached from a linear object, and comprises a base part and a clip body having a pair of clip parts openably joined to the base part, and a holding part for holding the linear object inside the linear object identification tag is formed on an inner face of at least one of the clip parts. Therefore, installation is possible by simply inserting the linear object from an aperture part, and the efficiency of the installation operation can be greatly improved. Furthermore, because the shape and dimensions of the linear object are not especially restricted provided that it can be fitted inside the linear object identification tag, it is applicable to various types of linear object of different shapes and dimension, and as there is no cumbersome task such as preparing many types of linear object identification tags to suit the linear objects, and selecting a linear object identification tag to suit a linear object during the installation, there is the advantage that the installation operation can be made more efficient.

Another aspect of the present invention is a method for connector interconnection management, which manages an interconnection status of a plurality of connectors with a plurality of connector receptacles, wherein the method manages the interconnection status of the connector with the connector receptacle, when connection and disconnection of a connector is carried out by a connector interconnection instrument which has a connector connection and disconnection function for connecting a connector to a connector receptacle and disconnecting a connector from a connector receptacle, by carrying out reading or writing by means of the connector interconnection instrument, for at least one of: connector information assigned to a connector, connector receptacle information assigned to a connector receptacle, and connector connection presence information indicating whether or not a connector is connected to a connector receptacle. According to this method for connector interconnection management, it becomes possible to correctly acquire connector information assigned to a connector, connector receptacle information assigned to a connector receptacle, and connector connection presence information, during a series of connection and disconnection operations of a connector, and connector interconnection status can be managed accurately.

The invention claimed is:

1. A linear object identification tag which can be attached to and detached from a linear object, comprising:
   a clip body having a base part and a pair of clip parts openably joined to the base part, and
   a holding part formed on an inner face of at least one of the clip parts for holding the linear object inside the linear object identification tag;
   wherein the linear object identification tag further comprises a band for fixing the linear object identification tag to another linear object, and two or more band holes for passing the band there-through are formed on at least one of the clip parts.

2. A linear object identification tag according to claim 1, wherein the holding part has a presser part which elastically presses a linear object against an inner face of the base part or the clip part.

3. A linear object identification tag according to claim 1, wherein the holding part has an anti-disengagement tongue piece, which is formed to extend from an inner face of the clip part, and which prevents the linear object from falling out from between the clip parts.

4. A linear object identification tag according to claim 1, wherein the holding part has;
   a presser part which elastically presses the linear object against an inner face of the base part or the clip part, and
   an anti-disengagement tongue piece, which is formed to extend out from an inner face of the clip part, and which prevents the linear object from falling out from between the clip parts.

5. A linear object identification tag according to claim 1, wherein a spacing of an aperture part formed at an end of the pair of clip parts is smaller than a width of the base part.

6. A linear object identification tag according to claim 1, wherein on an inner face of at least one of the clip parts is formed a rough surface having a plurality of protrusions at a position where the linear object contacts.

7. A linear object identification tag according to claim 6, wherein the protrusions of the rough surface are a plurality of ridges extending in parallel with a longitudinal direction of a linear object held by the linear object identification tag.

8. A linear object identification tag according to claim 1, further having a band for fixing the linear object identification tag to the linear object, and two or more band holes for passing a band there-through are formed on at least one of the clip parts.

9. A linear object identification tag according to claim 1, wherein the clip parts have a contour formed with curved lines.

10. A linear object identification tag according to claim 1, wherein each of the pair of clip parts have a wide part which is longer than a length of the base part.

11. A linear object identification tag according to claim 1, wherein the identification label is provided on an outer surface of one of the clip parts.

12. An installation instrument for installing the linear object identification tag of claim 1 on a linear object, comprising:
 a slide member which engages slidably with the linear object identification tag;
 an opening guide which holds the linear object, contacts with an inner face of the clip part while the linear object identification tag slides along the slide member, and opens the two clip parts; and
 wherein the linear object identification tag is made to contact the opening guide, the two clip parts are opened, and then the linear object identification tag is installed on the linear object.

13. An installation method for installing the linear object identification tag of claim 1 onto a linear object, comprising:
 a step for slidably engaging a slide member with the linear object identification tag;
 a step for making an opening guide hold the linear object, and making the linear object identification tag slide along the slide member, and making the opening guide contact an inner face of the clip part, and opening the two clip parts; and
 a step for making the linear object identification tag contact the opening guide, opening the two clip parts, and installing the linear object identification tag on the linear object.

14. A linear object identification tag which can be attached to and detached from a linear object, comprising: a clip body having a base part, and a holding part formed on an inner face of at least one of the clip parts for holding the linear object inside the linear object identification tag, wherein one or more guide parts extending in an orthogonal direction to an inner surface of the base part are provided on an outer face of at least one of the clip parts, and the guide parts engage slidably with a slide member provided in an installation instrument which houses the linear object identification tag and installs it on a linear object.

15. A linear object identification tag according to claim 11, wherein the identification label has a bar code or a two-dimensional code.

\* \* \* \* \*